US009767146B2

(12) United States Patent
Bhaghavan et al.

(10) Patent No.: US 9,767,146 B2
(45) Date of Patent: Sep. 19, 2017

(54) USE OF GENERATED SQL FOR EVALUATION OF DECISION POINT RULES IN A WORKFLOW SYSTEM

(75) Inventors: Rupa Bhaghavan, San Jose, CA (US);
Wayne Frederick Miller, Cary, NC (US); Kenneth Carlin Nelson, Hollister, CA (US); Sharon McKenna Sanders, Los Gatos, CA (US); Fang-Yi Wang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1415 days.

(21) Appl. No.: 10/933,917

(22) Filed: Aug. 31, 2004

(65) Prior Publication Data
US 2006/0053106 A1 Mar. 9, 2006

(51) Int. Cl.
G06F 17/30 (2006.01)
G06Q 10/06 (2012.01)

(52) U.S. Cl.
CPC ....... *G06F 17/30421* (2013.01); *G06Q 10/06* (2013.01)

(58) Field of Classification Search
USPC .............. 705/9, 7, 4; 707/10, 201; 719/328; 370/395
See application file for complete search history.

(56) References Cited

U.S. PATENT DOCUMENTS

| | | | |
|---|---|---|---|
| 6,081,811 A * | 6/2000 | Nilsson | 707/201 |
| 6,115,703 A * | 9/2000 | Bireley | G06F 17/3048 707/704 |
| 6,341,369 B1 | 1/2002 | Degenaro et al. | 717/1 |
| 6,697,784 B2 * | 2/2004 | Bacon | G06Q 10/06316 705/7.26 |
| 6,697,808 B1 * | 2/2004 | Hurwood et al. | 707/10 |
| 7,047,535 B2 * | 5/2006 | Lee et al. | 719/328 |
| 7,069,234 B1 * | 6/2006 | Cornelius et al. | 705/80 |
| 7,529,762 B2 * | 5/2009 | Casati et al. | 707/999.1 |
| 2002/0016953 A1 | 2/2002 | Sollich | 717/1 |
| 2002/0052771 A1 | 5/2002 | Bacon et al. | 705/8 |
| 2002/0059199 A1 | 5/2002 | Harvey | 707/3 |
| 2002/0146012 A1 * | 10/2002 | Coutuier | 370/395.2 |
| 2003/0004767 A1 * | 1/2003 | Ohsaki | 705/7 |

(Continued)

OTHER PUBLICATIONS

DB2 Content Manager for Multiplatforms—Routing and Workflow—IBM Software [online]. [retrieved on Jun. 30, 2004]. Retrieved from the Internet: <URL: http://www-306.ibm.com/software/data/cm/cmgr/mp/workflow.html>.

(Continued)

*Primary Examiner* — Sangwoo Ahn
(74) *Attorney, Agent, or Firm* — Maeve Carpenter; Matthew M. Hulihan; Heslin Rothenberg Farley & Mesiti PC

(57) ABSTRACT

Various embodiments of a method, apparatus and article of manufacture provide a decision point in a workflow system comprising a server and at least a first client work node. A decision point work node is provided at the server. A SQL expression which is associated with the decision point work node and the first client work node is generated. The server determines whether to route a work package to the first client work node based on the SQL expression.

18 Claims, 21 Drawing Sheets

(56) References Cited

U.S. PATENT DOCUMENTS

| | | | | |
|---|---|---|---|---|
| 2003/0081001 | A1 | 5/2003 | Munro | 345/752 |
| 2003/0163461 | A1 | 8/2003 | Gudbjartsson et al. | 707/3 |
| 2003/0202017 | A1 | 10/2003 | Fukuoka et al. | 345/809 |
| 2003/0212670 | A1 | 11/2003 | Yalamanchi et al. | 707/3 |
| 2003/0236838 | A1* | 12/2003 | Ouchi | G06Q 10/10 709/205 |
| 2004/0030679 | A1 | 2/2004 | Gonnet | 707/3 |
| 2004/0078784 | A1 | 4/2004 | Bates et al. | 717/129 |
| 2004/0093242 | A1* | 5/2004 | Cadigan et al. | 705/4 |
| 2005/0246686 | A1* | 11/2005 | Seshadri et al. | 717/117 |
| 2006/0155689 | A1* | 7/2006 | Blakeley et al. | 707/3 |

OTHER PUBLICATIONS

DB2 Content Manager for iSeries—Product Overview—IBM Software [online]. [retrieved on Jun. 30, 2004]. Retrieved from the Internet: <URL: http://www-306.ibm.com/software/data/cm/cmgr/400/>.

Microsoft Office Online: InfoPath 2003 Home Page, [online]. © 2004 Microsoft Corporation [retrieved on Jun. 30, 2004 ]. Retrieved from the Internet: <URL: http://office.microsoft.com/home/office.aspx?assetid=FX01085792>.

InfoPath 2003 Product Information: The Microsoft Office information gathering and management program, [online]. © 2004 Microsoft Corporation [retrieved on Jun. 30, 2004]. Retrieved from the Internet: <URL: http://www.microsoft.com/office/infopath/prodinfo/default.mspx>.

InfoPath 2003 Product Overview, [online]. published Mar. 10, 2003 [retrieved on Jun. 30, 2004]. Retrieved from the Internet: <URL: http://www.microsoft.com/office/infopath/prodinfo/overview.mspx>.

InfoPath 2003 Frequently Asked Questions, [online]. published May 31, 2003, updated Feb. 27, 2004 [retrieved on Jun. 30, 2004] Retrieved from the Internet: <URL: http://www.microsoft.com/office/infopath/prodinfo/faq.mspx>.

Microsoft Office InfoPath 2003 Product Guide, [online] © 2003-2004 Microsoft Corporation [retrieved on Jun. 30, 2004]. Retrieved from the Internet: <URL: < http://download.microsoft.com/download/f/a/7/fa7522e1-6d54-407a-9e22-5f1a03fb2247/productguide.doc>.

SQL Reference, Open, [online]. [retrieved on Aug. 9, 2004]. Retrieved from the Internet: <URL: https://aurora.vcu.edu/db2help/db2s0/sq1s0644.htm>.

* cited by examiner

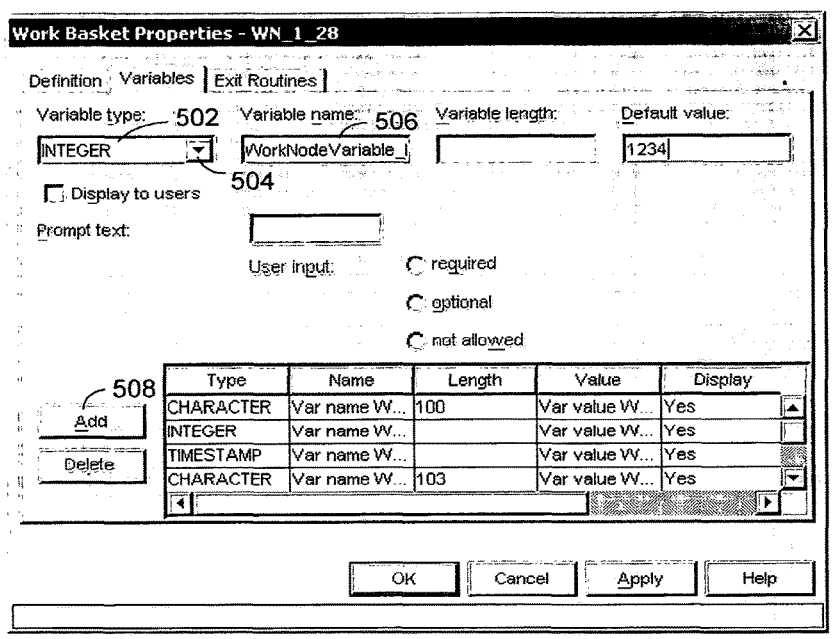
FIG. 24
FIG. 25
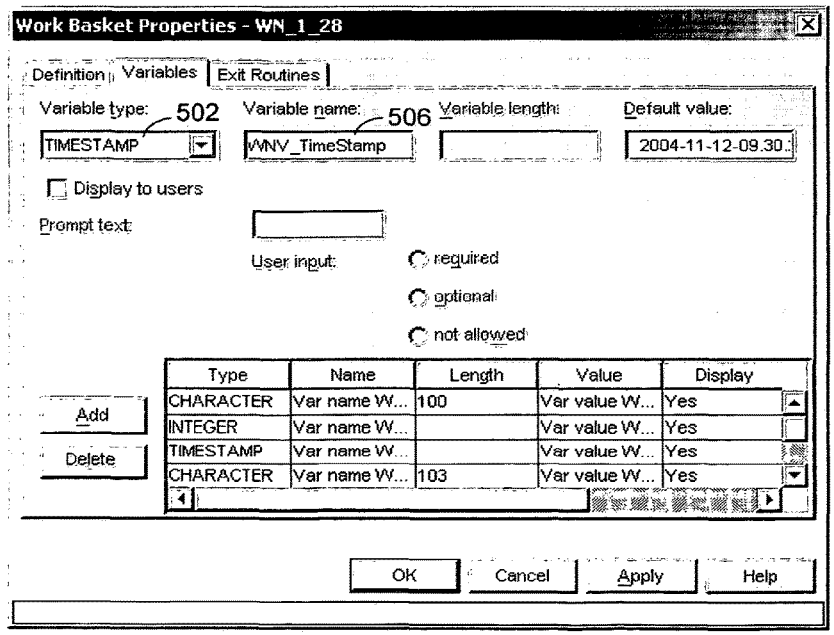
FIG. 26

USE OF GENERATED SQL FOR EVALUATION OF DECISION POINT RULES IN A WORKFLOW SYSTEM

BACKGROUND OF THE INVENTION

1. Field of the Invention

This invention relates to a workflow system; and in particular, this invention relates to using a generated structured query language (SQL) expression for evaluation of decision point rules in a workflow system.

2. Description of the Related Art

Workflow systems are used to process documents. In a workflow system, documents are distributed to users at work nodes.

FIG. 1 depicts a block diagram of a conventional workflow process 20 having n work nodes 22-24. At work node 1 22, a user scans a document, for example, an insurance claim for an insured person. Work node 1 22 produces a work package 26 containing the scanned document. Work node 1 22 sends the work package 26 to another work node 2 23 for further processing. For example, at work node 2 23, another user may verify that the information in the document is completed for certain fields. At work node 2 23, the work package 26 is processed and forwarded to the next work node. Subsequent work nodes process the work package 26 until the processing is complete at work node n 24. Typically, a server 27 is coupled to the work nodes 22-24 and the work nodes 22-24 are clients of the server 27. Different software applications for processing the work package 26 are typically installed on the different client work nodes 22-24.

One workflow system provides decision points to control the routing of the work package. However, existing implementations of decision points provide a limited set of operations. A decision point is typically associated with an expression to control the routing of the work package at the client work node. To determine which route a client work node should take and process the work package, the client application at the client work node interprets and executes the expression when it receives the work package. Any extension to the expression requires that the user learn a new syntax, that is, the syntax of the software application installed at the client work node. In addition, the extension may need to be implemented by the software application at one or more work nodes of a process. Learning a new syntax and adding an extension at one or more work nodes is time-consuming and expensive.

Therefore there is a need for an improved technique to provide decision points in a workflow system. This technique should provide a uniform syntax. In addition, this technique should not require a plurality of work nodes to determine whether those work nodes should process the work package.

SUMMARY OF THE INVENTION

To overcome the limitations in the prior art described above, and to overcome other limitations that will become apparent upon reading and understanding the present specification, various embodiments of a method, apparatus and article of manufacture to provide a decision point in a workflow system are described. The workflow system comprises a server and at least a first client work node. A decision point work node is provided at the server. A SQL expression which is associated with the decision point work node and the first client work node is generated. The server determines whether to route a work package to the first client work node based on the SQL expression.

In this way, a method, apparatus and article of manufacture provide a decision point. In various embodiments, a uniform syntax for decision point rules is provided. In addition, because the decision point work node is implemented in the server and because the server determines whether to route a work package to a client work node, the client work nodes do not determine whether they should process the work package.

BRIEF DESCRIPTION OF THE DRAWINGS

The teachings of the present invention can be readily understood by considering the following description in conjunction with the accompanying drawings, in which:

FIG. 24 depicts an exemplary work basket properties window in which a work node variable of the type integer is defined;

FIG. 25 depicts an exemplary list of work node variable types;

FIG. 26 depicts an exemplary work basket properties window in which a work node variable of the type timestamp is defined.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to provide a decision point in a workflow system. In various embodiments, a workflow system comprises a server and at least a first client work node. A decision point work node is provided at the server. A SQL expression which is associated with the decision point work node and the first client work node is generated. The server determines whether to route a work package to the first client work node based on the SQL expression.

Figure 1:
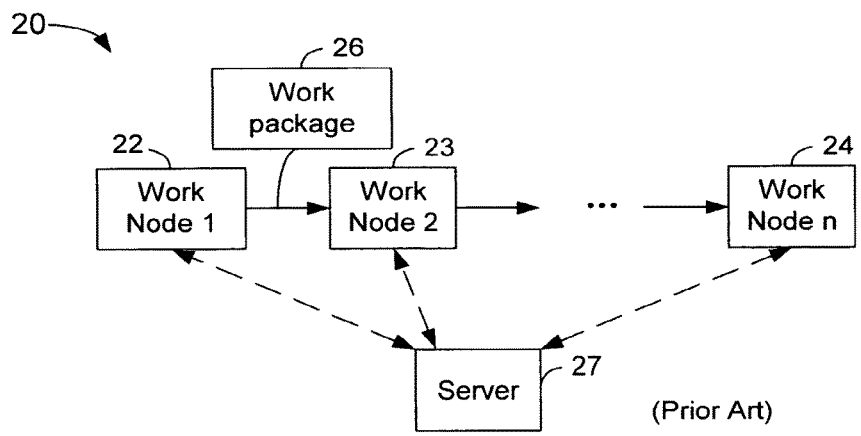
FIG. 1 depicts a block diagram of a conventional workflow process.
Figure 2:
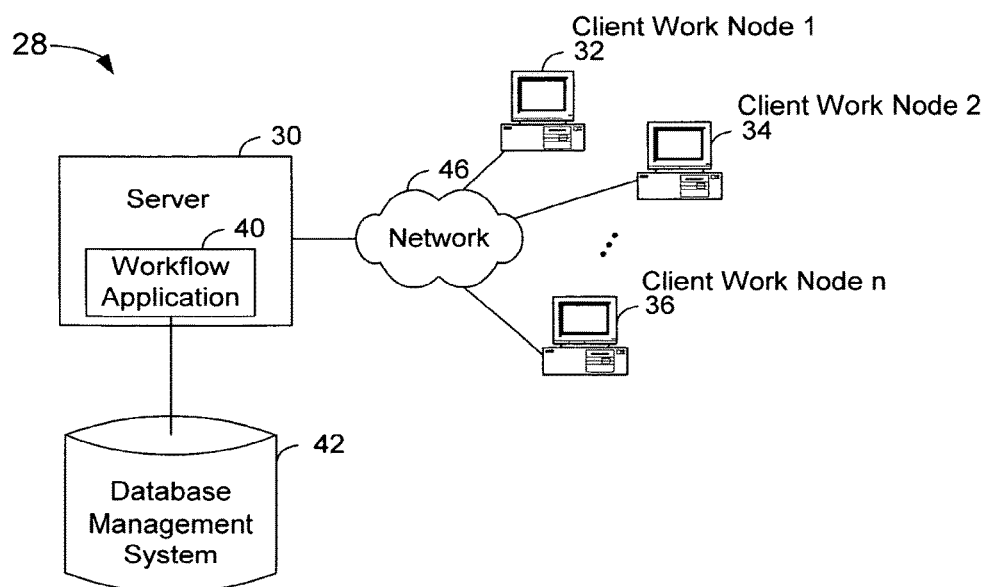
FIG. 2 depicts a high-level block diagram of an exemplary workflow system which uses various embodiments of the present invention.

FIG. 2 depicts a high-level block diagram of an exemplary workflow system 28 which uses various embodiments of the present invention. In the workflow system 28, the server 30 is coupled to client work nodes 32-36. The server 30 executes a workflow application 40 that uses various embodiments of the present invention. The workflow application 40 is coupled to a database management system 42. A network 46 couples the server 30 to the client work nodes 32-36.

Figure 3:
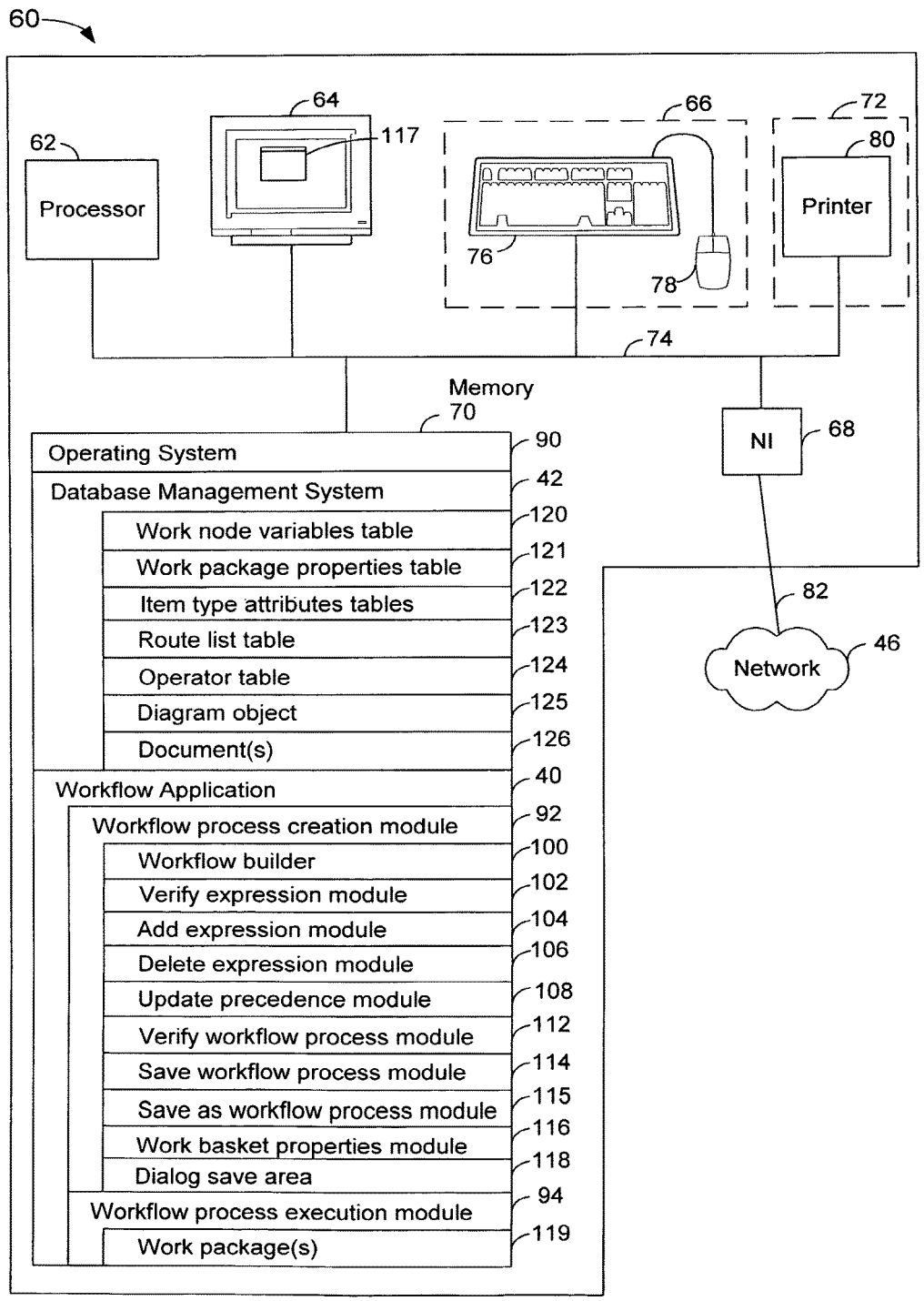
FIG. 3 depicts an illustrative computer system which uses various embodiments of the present invention.

FIG. 3 depicts an embodiment of an illustrative computer system 60 which uses various embodiments of the present invention. In various embodiments, the computer system 60 implements the server 30 of FIG. 2. The computer system 60 comprises a processor 62, display 64, input interfaces (I/F) 66, communications interface 68, memory 70 and output interface(s) 72, all conventionally coupled by one or more buses 74. The input interfaces 66 comprise a keyboard 76 and a mouse 78. The output interface 72 comprises a printer 80. The communications interface 68 is a network interface (NI) that allows the computer 60 to communicate with the client work nodes via the network 46. The communications interface 68 may be coupled to a transmission medium 82 such as, a network transmission line, for example twisted pair, coaxial cable or fiber optic cable. In another embodiment, the communications interface 68 provides a wireless interface, that is, the communications interface 68 uses a wireless transmission medium.

The memory 70 generally comprises different modalities, illustratively semiconductor memory, such as random access memory (RAM), and disk drives. In various embodiments, the memory 70 stores an operating system 90, a database management system 42 and the workflow application 40.

In various embodiments, the workflow application 40 comprises a workflow process creation module 92 and a workflow process execution module 94. The workflow process creation module 92 comprises a workflow builder 100, a verify expression module 102, an add expression module 104, a delete expression module 106, an update precedence module 108, a verify workflow process module 112, a save workflow process module 114, a save as workflow process module 115, and a work basket properties module 116. In various embodiments, the workflow process creation module 92 has a dialog save area 118 to store information about any decision points as the decision points are defined. The workflow process creation module 92 provides a graphical user interface 117 using the display 64.

In various embodiments, the workflow process execution module 94 comprises one or more work packages 119. The workflow process execution module 94 executes a workflow process which is created by the workflow process creation module 92.

In some embodiments, the database management system 42 comprises a work node variables table 120, a work package properties table 121 and one or more item type attributes tables 122. The work node variables table 120, a work package properties table 121 and one or more item type attributes tables 122 store data which is associated with the work packages. In various embodiments, the database management system 42 also has a route list table 123 which stores information about the workflow process and which is used by the workflow process execution module 94 to route a work package 119. Alternately, the route list table 123 is implemented as an array in the workflow application 40, rather than as a database table in the database management system. In some embodiments, the database management system also stores an operator table 124 which provides the operator names that can be used to construct a decision point expression. In various embodiments, the database management system 42 stores a diagram object 125, for example as a binary large object, in another table, which is used when rendering various aspects of the workflow process in the graphical user interface. Typically the data base management system 42 stores one or more documents 126 which are associated with the work packages 119.

In various embodiments, the data associated with the work package 119 is stored in the work node variables table 120, the work package properties table 121 and the item type attributes tables 122. The work package 119 typically contains a reference to, that is, points to, a document 126 in the database 42; the document 126 could have been scanned in. At runtime both an application at the client and the workflow process execution module 94 at the server can retrieve the work package 119. The client application and the workflow process execution module 94 can also retrieve the document that the work package references. The client application and workflow process execution module 94 can retrieve the work node variables for the given work package using an application programming interface (API). A client application or the workflow process execution module 94 can update the work node variables in the work node variables table. For example, the client application can set a work node variable called "loan amount" to a value. Updating the work node variables associated with a work package does not change the document that was scanned in. In various embodiments, the client application and the workflow process execution module 94 can also update the work package properties table 121 and item type attributes tables 122 for a work package 119.

In various embodiments, the specific software instructions, data structures and data that implement various embodiments of the present invention are typically incorporated in the workflow application 40, and in some embodiments, are also incorporated in the database management system 42. Generally, an embodiment of the present invention is tangibly embodied in a computer-readable medium, for example, the memory 70 and is comprised of instructions which, when executed by the processor 62, cause the computer system 60 to utilize the present invention. The memory 70 may store the software instructions, data structures and data for any of the operating system 90, database management system 42 and the workflow application 40 in semiconductor memory, in disk memory, or a combination thereof.

The operating system 90 may be implemented by any conventional operating system such as AIX® (Registered Trademark of International Business Machines Corporation), UNIX® (UNIX is a registered trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

The workflow application is typically IBM® (Registered trademark of International Business Machines Corporation) Content Manager in which various embodiments of the present invention are implemented. However, the present invention is not meant to be limited to IBM® Content Manager and may be used in other workflow applications.

In some embodiments, the database management system 42 is the IBM® DB2® (Registered trademark of International Business Machines Corporation) database management system. However, the present invention is not meant to be limited to the IBM® DB2® database management system and may be used with other database management systems. For example, in some embodiments, the present invention may be used with other database management systems such as the Oracle® (Registered trademark of Oracle International Corporation) database management system and Microsoft® (Registered trademark of Microsoft Corporation) SQL server.

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 3 is not intended to limit the present invention. Other alternative hardware environments may be used without departing from the scope of the present invention.

Figure 4:
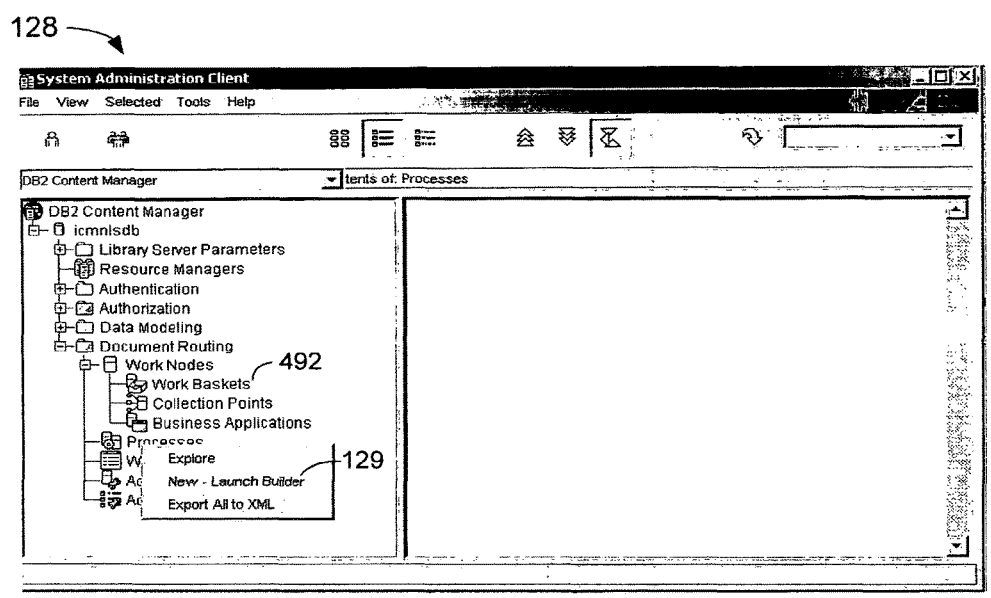
FIG. 4 depicts an exemplary administration window which is displayed when the workflow application of FIG. 3 is invoked.

FIG. 4 depicts an exemplary administration window 128 which is displayed when the workflow application 40 (FIG. 3) is invoked. In response to selecting the "New—Launch Builder" menu item 129, the workflow builder 100 (FIG. 3) of the workflow process creation module 92 (FIG. 3) is invoked.

Figure 5:
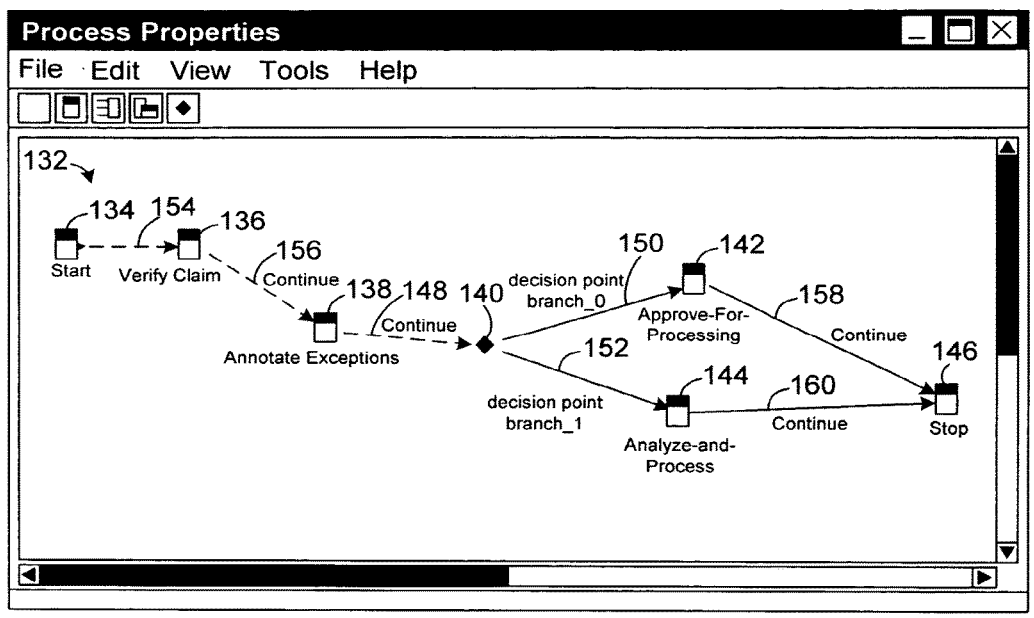
FIG. 5 depicts an exemplary workflow process properties window of the graphical user interface of the workflow builder of FIG. 3 in which an exemplary workflow process is displayed.

FIG. 5 depicts an exemplary workflow process properties window 130 of the graphical user interface of the workflow builder 100 of FIG. 3. In various embodiments, the workflow builder 100 (FIG. 3) displays the workflow process properties window 130. The workflow process properties window 130 is used to graphically construct and display a workflow process. In FIG. 5, a diagram of an exemplary workflow process 132 is displayed. The workflow process 132 is executed in a workflow system, for example, the workflow system 28 of FIG. 2.

The workflow process 132 comprises work nodes 134-146. Work nodes 134, 136, 138, 142, and 144 are represented using a first symbol, in this example, a rectangular block. Work nodes 134, 136, 138, 142, and 144 are client work nodes. Work node 140 is a decision point work node and is represented by a second symbol, different from the first symbol, in this example, a diamond-shaped block. A decision point work node has one or more incoming paths, or routes, 148 and a plurality of outgoing paths, or routes, 150 and 152. The outgoing paths of the decision point work node will be referred to as branches. The branches are associated with respective branch names. For example, branch 150 has a branch name of decision point branch_0, and branch 152 has a branch name of decision point branch_1. Each branch is also associated with a destination work node which is also referred to as the "to-node". The approve-for-processing work node 142 is the destination work node which is associated with branch 150. The analyze-and-process work node 144 is the destination work node which is associated with branch 152.

The exemplary workflow process 132 of FIG. 5 processes an insurance claim. At a start work node 134, a claim is received on paper, is scanned and stored in a documents table 126 (FIG. 3) of the database management system 42 (FIG. 3) and that document is referenced in a work package. The work package is routed, as shown by branch 154, to another work node 136, called Verify Claim, to verify the claim. The user may enter information about the claim into the database 42 (FIG. 3). For example, the user may update a work node variable associated with the work package in the work nodes variables table. After verifying the claim, the work package is routed, as shown by branch 156, to another work node 138, called Annotate Exceptions, which annotates any exceptions. After any exceptions are annotated, the work package is routed, as shown by branch 148, to the decision point work node 140.

The decision point work node 140 has two branches, decision point branch_0 150 and decision point branch_1 152. Decision point branch_0 150 is associated with a SQL expression. The workflow process execution module 94 (FIG. 3) of the workflow application 40 (FIG. 3) evaluates the SQL expression at the server. In response to the SQL expression evaluating to true, the server routes the work package to the approve-for-processing work node 142; otherwise the server routes the work package to the analyze-and-process work node 144.

After the approve-for-processing work node 142 completes its processing, the work package is routed as shown by path 158 to the stop work node 146. After the analyze-and-process work node 144 completes its processing, the work package is routed as shown by branch 160 to the stop work node 146.

In a conventional workflow process, no separate decision point work node is provided by the server. Each client work node receives the work package and determines, locally at that client work node, which route a client work node should take to be processed at that client work node. In the conventional workflow process, when the work package is not to be processed at that client work node, the client work node informs the server and the server routes the work package onto the next work node. As a result, a conventional client work node implements software, in at least one of its local applications to determine whether that client work node should process the work package.

SQL is a well-known query language for accessing and modifying information in a database. Standards, such as the ANSI X.3.135-1992, "Database Language SQL" and the ISO/IEC 9075: 1992, "Information Technology—Database Languages—SQL," are available from the American National Standards Institute (ANSI).

Using various embodiments of the present invention, the decision point work node is implemented in the server. The rules for the decision point work node are defined by one or more SQL expressions. The server evaluates at least one SQL expression associated with the decision point work node and routes the work package to the appropriate client work node, that is, the destination work node, based on the evaluation. In this way, the client work nodes do not determine whether they should process a work package. In addition, because a SQL expression implements the decision point rules, a uniform syntax is provided.

Figure 6:
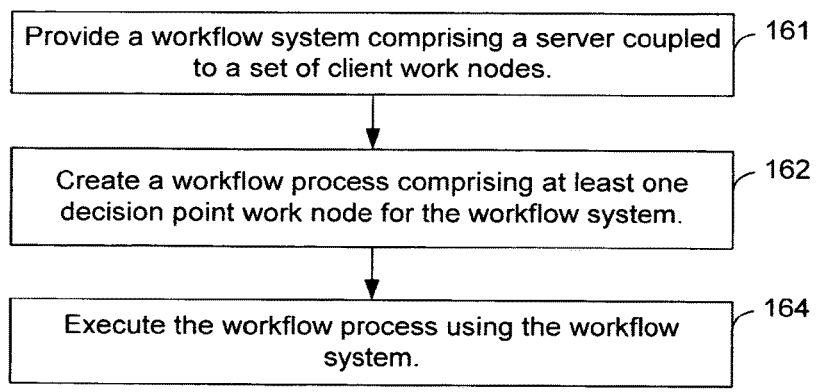
FIG. 6 depicts a high-level flowchart of an embodiment of providing a workflow system and a workflow process for the workflow system.

FIG. 6 depicts a high-level flowchart of an embodiment of providing a workflow system and a workflow process for the workflow system. In step 161, a workflow system comprising a server coupled to a set of client work nodes is provided. In various embodiments, the server is as shown in FIG. 3. In step 162, a workflow process comprising at least one decision point work node is created for the workflow system. In step 164, the workflow process is executed using the workflow system.

Figure 7:
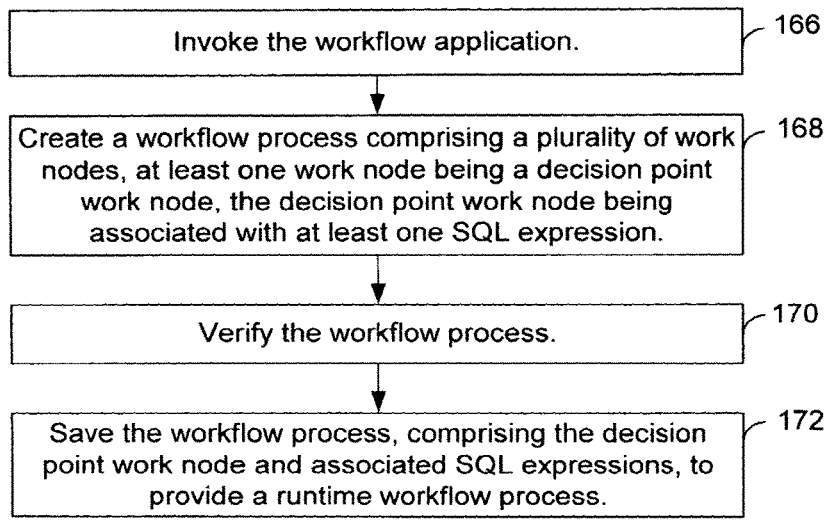
FIG. 7 depicts a flowchart of an embodiment of providing a workflow process comprising a decision point work node which is associated with at least one SQL expression to provide a runtime workflow process.

FIG. 7 depicts a flowchart of an embodiment of creating the workflow process of step 162 of FIG. 6. In step 166, the workflow application is invoked. In various embodiments, the workflow process creation module 92 (FIG. 3) is invoked. In step 168, a workflow process comprising a plurality of work nodes is created. At least one work node is a decision point work node which is associated with at least one SQL expression. In step 170, the workflow process is verified. In step 172, the workflow process comprising the decision point work node and associated destination nodes and SQL expression(s), is saved to provide a runtime workflow process. In various embodiments, the decision point work node, associated destination nodes and SQL expressions are stored in the route list table 123 (FIG. 3).

Figure 8:
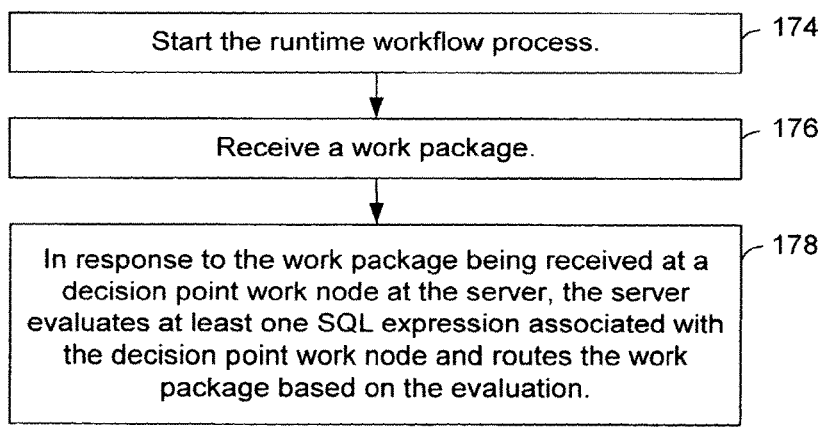
FIG. 8 depicts a flowchart of an embodiment of executing the runtime workflow process.

FIG. 8 depicts a flowchart of an embodiment of step 164 of FIG. 6 which executes the runtime workflow process. In various embodiments, the flowchart of FIG. 8 is implemented in the workflow process execution module 94 (FIG. 3). In step 174, the runtime workflow process is started. In various embodiments, the workflow process execution module 94 (FIG. 3) is started at the server. In step 176, a work package is received. In some embodiments, the runtime workflow process is started in response to receiving a work package.

In step 178, in response to the work package being received at a decision point work node at the server, the server, by executing the workflow process execution module 94 (FIG. 3), evaluates at least one SQL expression associated with the decision point work node and routes the work package to one of the client work nodes based on the evaluation.

Figure 9:
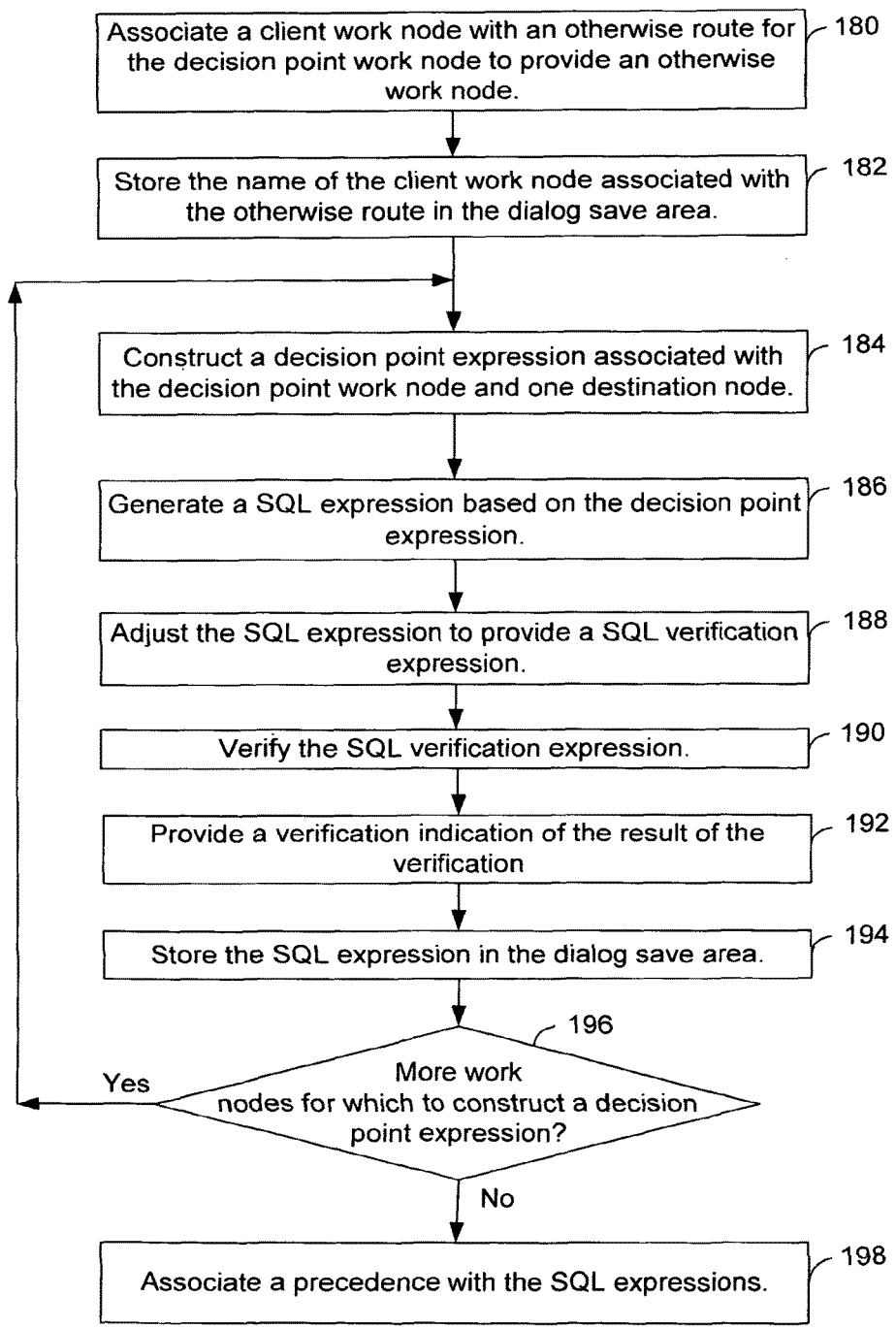
FIG. 9 depicts a flowchart of an embodiment of constructing one or more SQL expressions which are associated with a decision point work node.

FIG. 9 depicts a flowchart of an embodiment of providing one or more SQL expressions for a decision point work node. In step 180, a client work node is associated with an otherwise route for the decision point work node to provide an otherwise work node. In step 182, the name of the work node associated with the otherwise route is stored in the dialog save area 118 (FIG. 3). In step 184, the user constructs a decision point expression. The decision point expression is associated with the decision point work node and one destination work node. In step 186, a SQL expression is generated based on the decision point expression. In step 188, the SQL expression is adjusted to provide a SQL verification expression. In some embodiments, step 188 is omitted and the generated SQL expression is the same as the SQL verification expression. In step 190, the SQL verification expression is verified. In step 192, a verification indication of the result of the verification is provided. In some embodiments, steps 188, 190 and 192 are omitted. In step 194, the SQL expression is stored in the dialog save area. Alternately, the SQL expression is stored in the route list table 123 (FIG. 3). In step 196 the user determines whether there are more work nodes for which to construct a decision point expression. When, in step 196, there are more work nodes for which to construct a decision point expression, step 196 proceeds to step 184. When, in step 196, there are no more work nodes for which to construct a decision point expression, in step 198, a precedence is associated with the SQL expressions. In some embodiments, step 198 is omitted, and the SQL expressions will be evaluated in the order that they were generated. For example, the precedence for the SQL expression that was generated first is set equal to one, and the precedence for the second SQL expression that was generated is set equal to two. Alternately, no precedence is assigned and the SQL expressions are evaluated in the order that they are retrieved. In some embodiments, the SQL expressions and their associated precedence are stored in the route list table 123 (FIG. 3).

Figure 10:
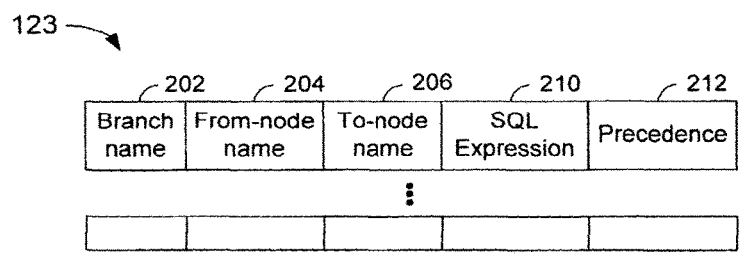
FIG. 10 depicts a diagram of an embodiment of the route list table of FIG. 3.

FIG. 10 depicts a diagram of an embodiment of the route list table 123 of FIG. 3. In some embodiments, FIG. 10 illustrates a portion of the columns of the route list table 123. The route list table 123 comprises, for the branches of the workflow process, a branch name 202, the from-node name 204, the to-node name 206, the SQL expression 210 and the precedence 212. For example, referring also to FIG. 5, the route list table has a row comprising "decision point branch_0", "decision point branch_1", "Approve-For-Processing", a SQL expression and a positive integer value, as the branch name 202, from-node name 204, to-node name 206, SQL expression 210, and precedence 212, respectively. In this example, the from-node name 204 contains the name of the decision point work node. The to-node name 206 contains the name of the destination work node. The precedence 212 associates an evaluation order with SQL expression for a branch. When the precedence 212 is equal to a positive integer, the server routes the work package to the associated work node having the to-node name based on the results of the evaluation of the associated SQL expression. An otherwise branch or work node has a precedence equal to zero. When the precedence 212 is equal to zero for a branch of a decision point work node, the server routes the work package to the work node associated with the to-node name for that branch when no SQL expression associated with the decision point work node evaluates to true.

Figure 11:
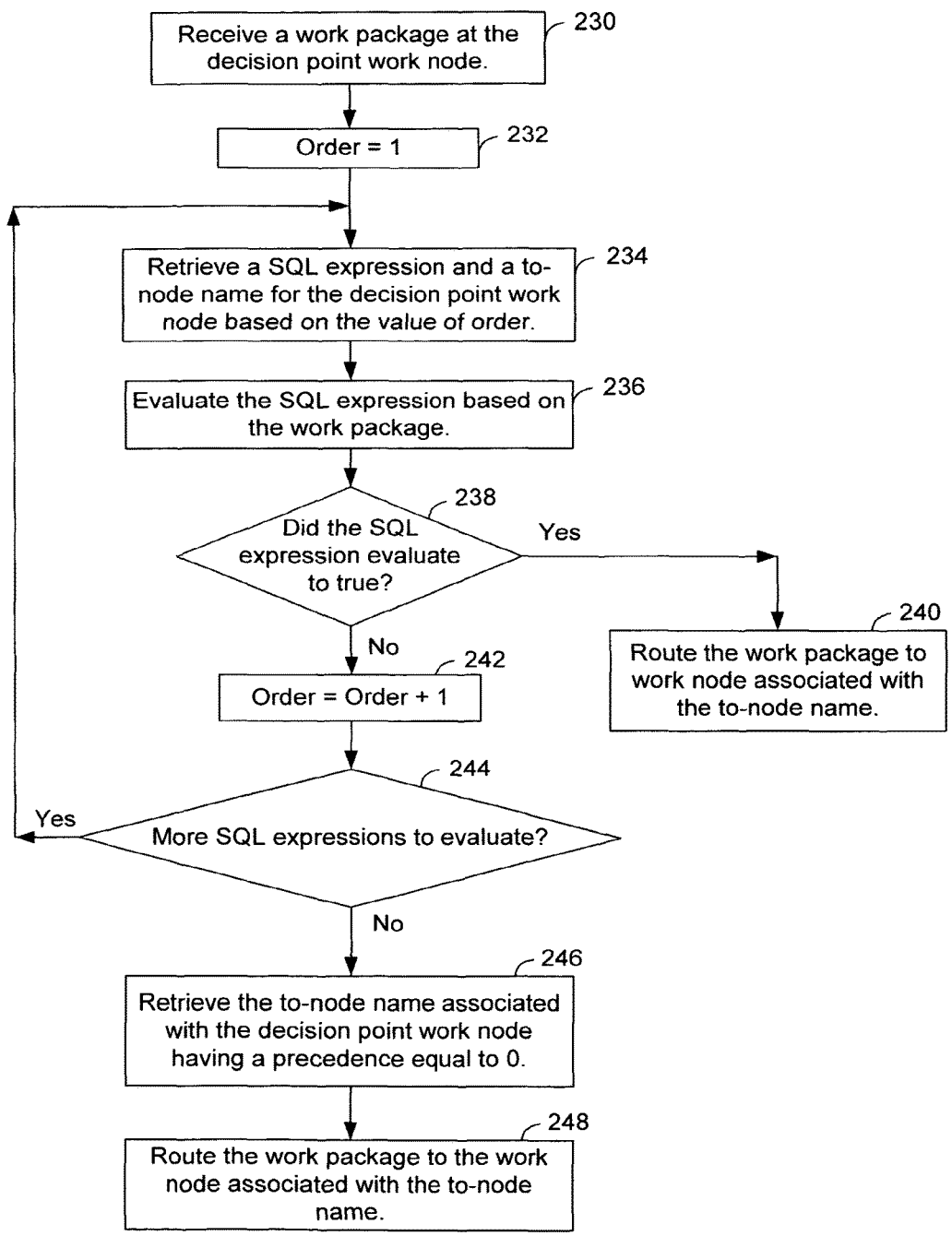
FIG. 11 depicts a flowchart of an embodiment of the processing performed by the server in response to routing a work package to a decision point work node in which one or more SQL expressions are evaluated in accordance with a precedence.

FIG. 11 depicts a flowchart of another embodiment of the processing performed by the server in response to routing a work package to a decision point work node in which one or more SQL expressions are evaluated in accordance with the value of the precedence 212 (FIG. 10). In various embodiments, the flowchart of FIG. 11 is implemented in the workflow process execution module 94 of FIG. 3.

In step 230, a work package is received at the decision point work node. In step 232, a variable, called Order, is set equal to one. In step 234, a SQL expression for the decision point work node as the from-node name 204 (FIG. 10) is retrieved based on the value of order. In various embodiments, the SQL expression for the decision point work node which has a precedence equal to the value of order is retrieved. In step 236, the SQL expression is evaluated based on the work package. Step 238 determines whether the SQL expression evaluated to true.

In response to step 238 determining that the SQL expression evaluated to true, in step 240, the work package is routed to the work node associated with the to-node name.

In response to step 238 determining that the SQL expression did not evaluate to true, in step 242, the value of order is incremented by one. Step 244 determines whether there are more SQL expressions to evaluate for the decision point work node. In response to step 244 determining that there are more SQL expressions to evaluate for the decision point work node, step 244 proceeds to step 234. In response to step 244 determining that there are no more SQL expressions to evaluate for the decision point work node, in step 246, the to-node name associated with the decision point work node having a precedence equal to zero is retrieved. In step 248, the work package is routed to the work node associated with the to-node name.

In various embodiments, the workflow builder 100 (FIG. 3) provides a graphical user interface to construct the decision point expression(s) associated with a decision point work node. In some embodiments, the decision point expression is constructed using at least one or any combination of a work node variable, a work package property and an item type attribute. Different dialogs within the graphical user interface are provided for each source of data to be included in the decision point expression. In various embodiments, the data sources comprise a work-node-variables data source, a work-package-properties data source and an item-type-attributes data source which contain the work node variables, work package properties and item type attributes, respectively. Typically, the work-node-variables, the work-package-properties and the item-type-attributes data sources comprise the work node variables, work package properties and the item type attributes tables, 120, 121 and 122 (FIG. 3), respectively.

Figure 12:
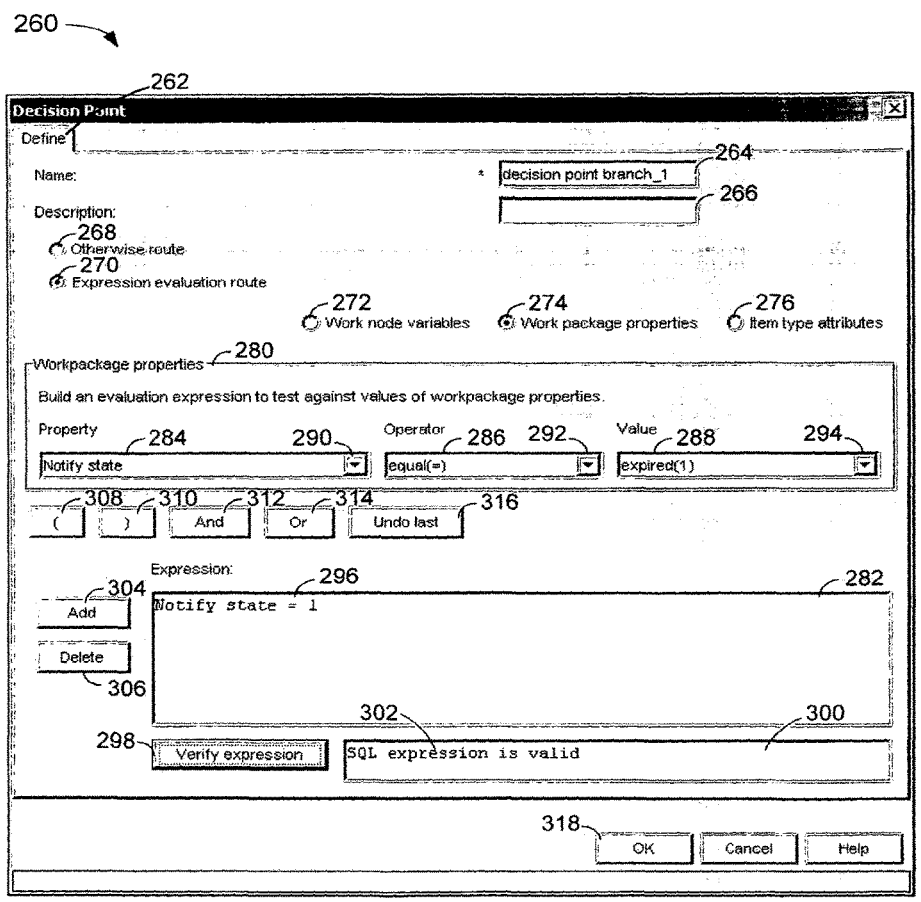
FIG. 12 depicts an embodiment of a decision point window of a graphical user interface, provided by the workflow builder of FIG. 3, to build a decision point expression for a selected branch of a decision point work node.

FIG. 12 depicts an embodiment of a decision point window 260 of the graphical user interface, provided by the workflow builder 100 (FIG. 3), to build a decision point expression for a selected branch of a decision point work node. In various embodiments, in response to clicking on, that is, activating, a branch associated with a decision point in the workflow process 132 of FIG. 5, for example, the branch named decision point branch_1 152 (FIG. 5), the workflow builder 100 (FIG. 3) displays the decision point window 260. In some embodiments, the decision point window 260 may be displayed in response to activating a menu item.

A define tab 262 allows a user to define a decision point expression and construct a SQL expression based on the decision point expression. The name of the decision point branch is displayed in a branch name text box 264. In this example the name of the branch is decision point branch_1. A description of the branch may be entered in a description text box 266.

A user defines how the branch is designated. Two radio buttons, an otherwise-route button 268 or an expression-evaluation route button 270, allow a user to designate the branch as an otherwise route or an expression evaluation route, respectively. In response to activating the otherwise-route button 268, the precedence 212 of the route list table 123 of FIG. 10 which is associated with the branch will be set equal to zero, otherwise, the precedence 212 (FIG. 10) will be set to a positive integer value The expression-evaluation route button 270 allows a user to designate the branch as an expression evaluation route. In response to activating the expression-evaluation route button 270, a decision point expression, and subsequently a SQL expression, is associated with the branch. The branch is associated with the decision point work node and a destination work node.

Radio buttons 272, 274 and 276 allow a user to select a data source. In this example, radio buttons 272, 274 and 276 allow a user to select from the work-node-variables data source, the work-package-properties data source and the item-type-attributes data source, respectively. When the decision point window is initially displayed, the radio button 272 associated with the work-node-variables data source is designated as the data source, and the displayed dialog box is for constructing a decision point expression using the work-node-variables data source. The work work-node-variables data source is the work node variables table 120 of FIG. 3.

In FIG. 12, the radio button 274 associated with the work-packages-properties data source is the selected data source and a work-packages-properties dialog box is displayed 280. The work package properties data source is the work package properties table 121 of FIG. 3. The decision point window 260 also has an expression area 282 which displays a decision point expression as it is constructed.

The work-package-properties dialog box 280 has a property text area 284, an operator text area 286 and a value text area 288 which are used to construct the decision point expression. The property text area 284, the operator text area 286 and the value text area 288 are associated with a property down arrow 290, an operator down arrow 292 and a value down area 294. When a down arrow is activated, a list is displayed. In some embodiments, the list is scrollable.

For example, in FIG. 12, the "Notify state" property has been selected from the properties list and is displayed in the property text area 284, the operator "equal (=)" has been selected from the operator list and is displayed in the operator text area 286, and the value of "expired(1)" has been selected from the value list and is displayed in the value text area 288. The associated expression "Notify state=1" 296 is displayed in the expression area 282.

In response to the verify expression button 298 being activated, the verify expression module 102 (FIG. 3) is invoked. The verify expression module 102 (FIG. 3) generates a SQL expression based on the displayed decision point expression 296, and verifies the SQL expression. To verify the SQL expression, the verify expression module 102 (FIG. 3) executes a SQL "prepare" for the SQL expression. A SQL prepare attempts to execute the SQL expression. The result of the verification is displayed in a verification text area 300. When the SQL prepare returns without an error, the message "SQL expression valid" 302 is displayed in the verification text area 300. When the SQL prepare returns with an error, a message which indicates that the SQL expression is not valid is displayed in the verification text area 300. In some embodiments, the particular error is displayed.

In response to activating an add button 304, the add expression module 104 (FIG. 3) is invoked. The add expression module 104 (FIG. 3) adds the portion of the expression built in the dialog area 280 to the decision point expression, if any, displayed in the expression area 282. For example, the expression "Notify state=1" 296 is appended to the decision point expression, if any, which is displayed in the expression area 282. In this example, because the expression area 282 did not contain a decision point expression, the expression 296 is the decision point expression.

In response to activating a delete button 306, a delete expression module 106 (FIG. 3) is invoked. The delete expression module 106 (FIG. 3) deletes the decision point expression from the expression area 282.

To form a more complex decision point expression, parentheses, an "And" operator, an "Or" operator, or a combination thereof, can be used. A left parenthesis button 308, a right parenthesis button 310, an "And" button 312, and an "Or" button 314 are provided to construct a decision point expression with a left parenthesis, a right parenthesis, an "And" operator and an "Or" operator, respectively. For example, in response to activating one of the left parenthesis, right parenthesis, "And" and "Or" buttons 308, 310, 312 and 314, respectively, the associated parenthesis or operator is displayed in the expression area 282. When a decision point expression is displayed in the expression area 282, the symbol or operator parenthesis is appended at the end of the displayed decision point expression. For example, in response to activating the left parenthesis button 308, a left parenthesis is displayed in the expression area 282. When a decision point expression is displayed in the expression area 282, the left parenthesis is appended at the end of the displayed decision point expression. Portions of the decision point expression may be nested using the parentheses. In addition, an Undo last button 316 is provided to allow a user to remove the last parentheses, "and" or "or" that was added to the decision point expression in the text area in response to a left parenthesis, right parenthesis, "And" and "Or" buttons.

In response to an OK button 318 being activated, the decision point branch name, the associated decision point work node name, the associated destination work node name, the decision point expression, and associated SQL expression, if any, are saved in the dialog save area 118 (FIG. 3). In this way, the decision point expression and the SQL expression, if any, are associated with the branch name and the from-node and to-node names of the branch.

Figure 13:
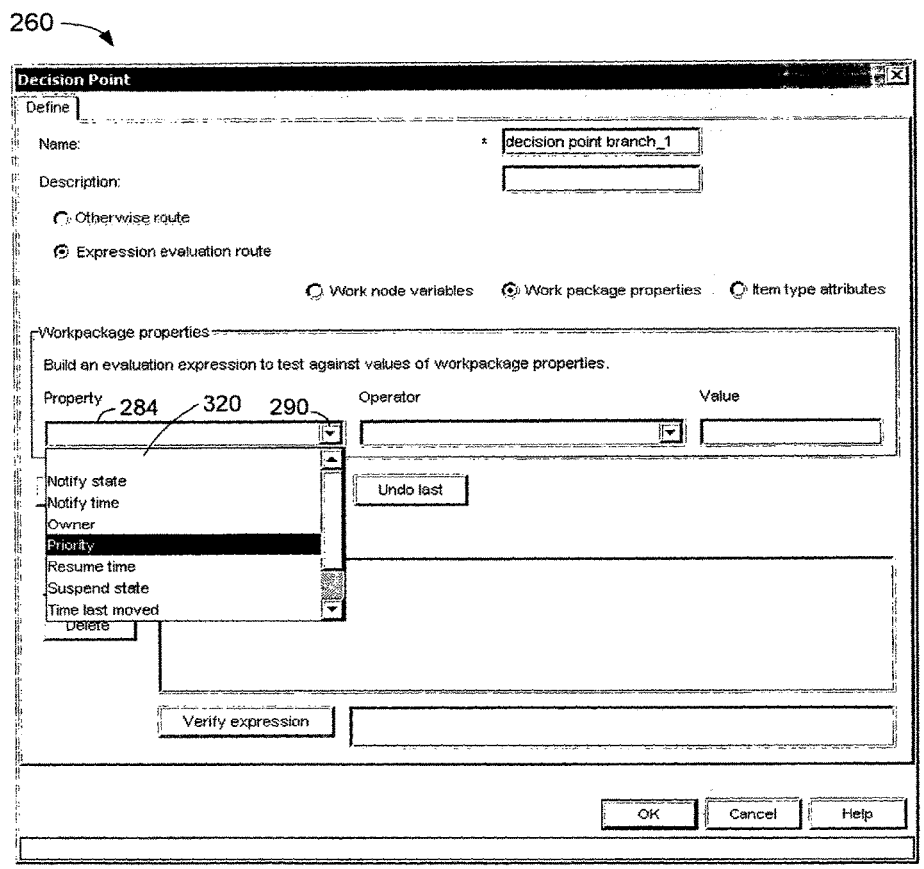
FIG. 13 depicts an embodiment of the decision point window provided by the workflow builder of FIG. 3 in which an exemplary properties list is displayed.

Referring also to FIG. 13, an embodiment of the decision point window 260 of FIG. 12 in which an exemplary properties list 320 is displayed. The properties list 320 allows a user to select a property name. When a properties down arrow 290 is clicked on, the properties list 320 is displayed. In various embodiments, the property names are retrieved from the work package properties table 121 (FIG. 3) and displayed in the properties list 320. In this example, the displayed property names comprise Notify state, Notify time, Owner, Priority, Resume time, Suspend state, and Time last moved. The work package properties table 121 (FIG. 3) is predefined. The user selects a property name from the properties list 320 and the selected property name is displayed in the properties text area 284. In addition, in various embodiments, the selected property name is displayed in the expression area 282. In some embodiments, a user may enter a property name directly in the properties text area 284 rather than selecting the property name from the properties list 320.

Figure 14:
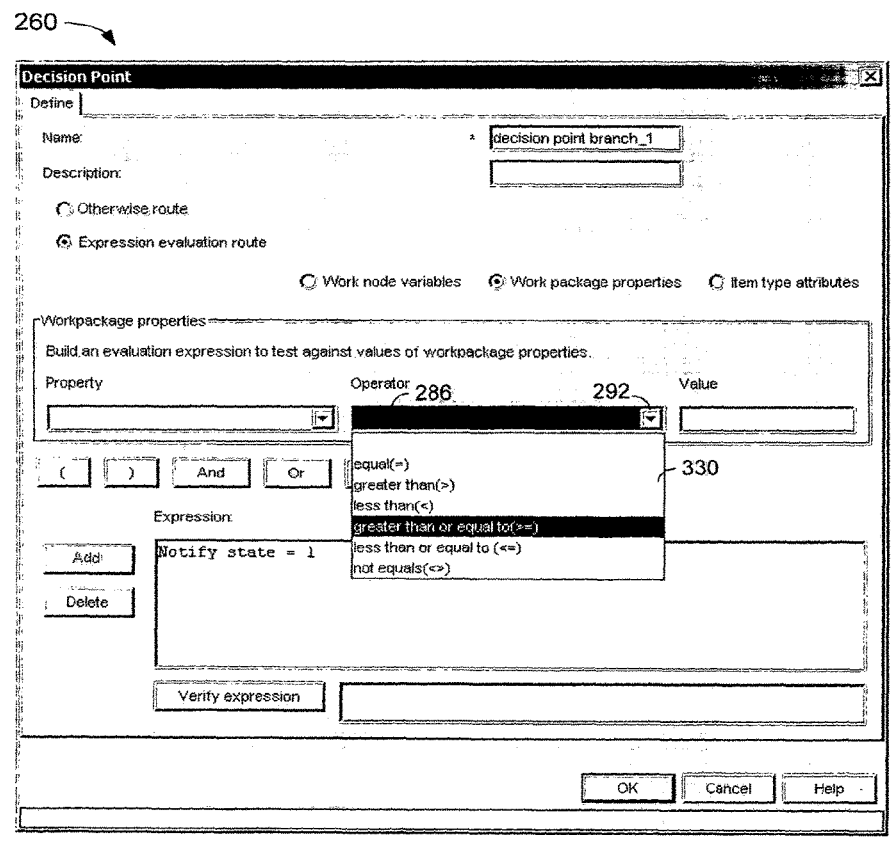
FIG. 14 depicts an embodiment of the decision point window provided by the workflow builder of FIG. 3 in which illustrates an exemplary operator list is displayed.

Referring also to FIG. 14, the embodiment of the decision point window 260 of FIG. 12 in which an exemplary operator list 330 is displayed. The operator list 330 allows a user to select an operator name. When the operator down arrow 292 is clicked on, the operator list 330 is displayed. The operator list comprises operator names such as equal, greater than, less than, greater than or equal to, less than or equal to and not equal. In various embodiments, the operator names are retrieved from the operator table 124 (FIG. 3) and displayed in the operator list 330. The operator table contains a predefined set of operator names. The user selects an operator name from the operator list and the selected operator name is displayed in the operator text area. In some embodiments, the operator list is specified in the code that generates the operator list rather than read from a table. In addition, in various embodiments, the operator that corresponds to the selected operator name is displayed in the expression area 282. In some embodiments, a user may enter an operator name directly in the operator area rather than selecting the operator name from the operator list 330.

Figure 15:
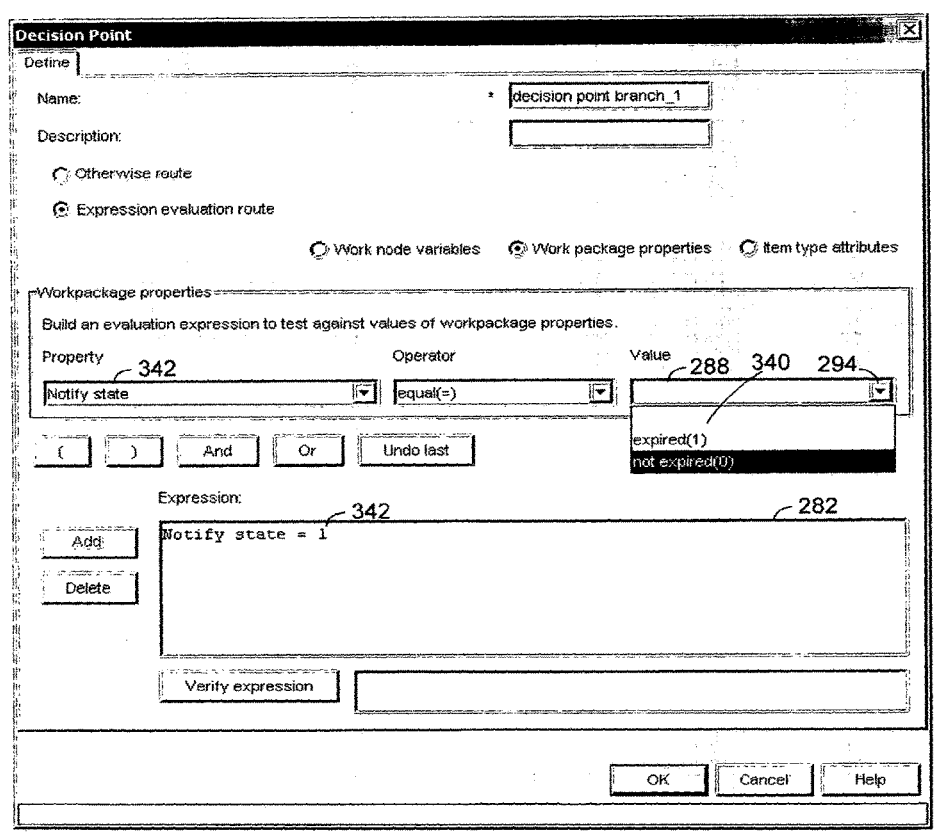
FIG. 15 depicts an embodiment of a the decision point window provided by the workflow builder of FIG. 3 in which illustrates an exemplary value list is displayed.

Referring also to FIG. 15, the embodiment of the decision point window 260 of FIG. 12 in which an exemplary value list 340 is displayed. The value list 340 allows a user to select a value name. When the value down arrow 294 is clicked on, the value list 340 is displayed. The value list 340 comprises value names for the property. In this example, for the property name "Notify state" 342, the value names in the value list 340 comprise expired(1) and not expired(0). In various embodiments, the value names for the property name are retrieved from the work package properties database table 121 and displayed in the value list. The user selects a value name from the value list 340 and the selected value is displayed in the value text area 288. In addition, the selected value name is displayed in the expression area 282. In some embodiments, a user may enter a value name directly in the value text area 288 rather than selecting a value name from the value list.

Referring back to FIG. 12, the construction of the exemplary decision point expression 296 will now be described. The user clicks on the properties down arrow 290 and selects the Notify state property name from the property list box 320 (FIG. 13). "Notify state" is displayed in the property text area 284. The user then clicks on the operator down arrow 292 and selects the equal operator from the operator list box 330 (FIG. 14). An equal sign is displayed in the operator text area 286. The user clicks on the value down arrow 294 and selects expired(1) from the value list box 340 (FIG. 15). The value of "1" is displayed in the value text area 288. In response to the add button 304 being activated, the decision point expression "Notify state=1" 296 is constructed and displayed in the expression area 282.

Figure 16:
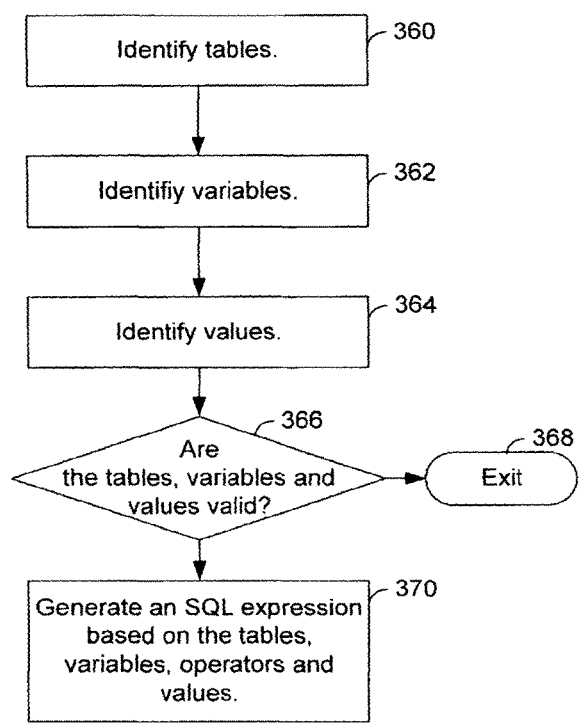
FIG. 16 depicts a flowchart of an embodiment of generating a SQL expression based on a decision point expression of the verify expression module of FIG. 3.

FIG. 16 depicts a flowchart of an embodiment of generating a SQL expression based on a decision point expression. In various embodiments, the flowchart of FIG. 16 is implemented in the verify expression module 102 of FIG. 3. In step 360, one or more tables associated with the decision point expression are identified based on whether work node variables, work package properties, item type attributes or a combination thereof were used to construct the decision point expression. In step 362, the variables of the decision point expression are identified. For example, a variable is the property name, Notify state. In step 364, the values of the decision point expression are identified. Step 366 determines whether the tables, variables and values are valid. If not, an error has occurred and, in step 368, the flowchart exits.

When step 366 determines that the tables, variables and values are valid, in step 370, the SQL expression is generated based on the tables, variables and values of the decision point expression. The generation of the SQL expression will be described by way of example. The SQL expression which is generated from the decision point expression, "Notify state=1" 296 of FIG. 12 is shown below:
SELECT 1 FROM ICMUT00204001 WP WHERE (WP.NOTIFYFLAG=1) AND WP.COMPONENTID=?

To generate the SQL expression, the phrase "SELECT 1 FROM" is output to a string, referred to as an expression string. When executed, this will select one row, if any. Next the table name is identified based on whether the work node variables, work package properties or item type attributes radio button was selected when constructing the decision point expression. In this example, the work package properties radio button was selected, therefore the work package properties table name is, for example, ICMUT00204001. In various embodiments, the name of the work package properties table is predefined.

A correlation name is associated with the table name. In this example, because the SQL expression is being constructed based on the work package properties, the correlation name is "WP". The table name followed by a space and the correlation name are output to the expression string. The correlation name is used in generating the SQL expression rather than the table name.

The "WHERE" clause is output to the expression string. A left parenthesis is output to the expression string. The column name which is associated with the selected property name is identified. In this example, the selected property name is Notify state. The work package properties table 121 (FIG. 3) associates the property name with a column name of the ICMUT002004001 table. The verify expression module 102 (FIG. 3) retrieves the column name from the work package properties table based on the property name. In this example, the column name for the Notify state property is Notifyflag. The verify expression module 102 (FIG. 3) then outputs the correlation name followed by a period followed by the column name, for example, WP.NOTIFYFLAG followed by a space to the expression string. Next the verify expression module 102 (FIG. 3) outputs the operator associated with the operator name, in this example, an equal sign, followed by a space to the expression string. In various embodiments, the operator names and the associated operators are stored in the operator table 124 (FIG. 3). The verify expression module 102 (FIG. 3) retrieves the operator associated with the operator name and outputs that operator.

The value names and their associated values are also stored in the work package properties table 121 (FIG. 3). The verify expression module 102 (FIG. 3) retrieves the value associated with the value name from the work package properties table 121 (FIG. 3), and outputs that value to the expression string followed by a right parenthesis.

The verify expression module 102 (FIG. 3) outputs "AND" to the expression string. The verify expression module 102 (FIG. 3) then outputs the correlation name followed by a period to the expression string. The verify expression module 102 (FIG. 3) then outputs "COMPONENTID=?" to the expression string. The expression string now contains a SQL expression. In this way, the current work package is specified using the COMPONENTID and a host variable "?". After the SQL expression is generated, the verify expression module 102 (FIG. 3) performs a SQL prepare on the SQL expression. In some embodiments, the verify expression module 102 (FIG. 3) adjusts the SQL expression to provide a SQL verification expression, and the SQL prepare is performed on the SQL verification expression.

When the workflow process execution module 94 (FIG. 3) evaluates, that is, executes, the SQL expression, the database management system substitutes the component id for the current work package in place of the question mark.

When a work package arrives at a decision point work node, the server, that is, the workflow process execution module 94 (FIG. 3) will evaluate each SQL expression associated with the decision point work node in accordance with the specified precedence. A SQL prepare will be performed for the SQL expression, and the SQL expression will then be executed. For example, in various embodiments, when evaluating a SQL expression, the workflow process execution module 94 of FIG. 3 retrieves the SQL expressions associated with the decision point in accordance with the precedence, starting with a precedence of one. A SQL open statement opens a cursor to the route list table 123 (FIG. 3) which is used to fetch rows associated with the decision point work node from that table. The rows contain the SQL expressions associated with the decision point work node. In the SQL expressions, the current work package identifier (COMPONENTID) is represented in the SQL expression by a question mark, and a host variable will be used in a SQL "open" statement. Starting with the SQL expression which has a precedence equal to one, the SQL prepare statement is issued for that SQL expression. The SQL prepare statement parses, rewrites and plans the SQL expression. Performing a SQL prepare statement for the SQL expression provides an optimized SQL expression for the database management system. In various embodiments, because a SQL prepare statement has been performed for the SQL expression, one advantage is that the database management system will cache the optimized SQL expression so when the next work package is processed in the decision point work node, the cost to prepare the SQL expression will be much lower.

Figure 17:
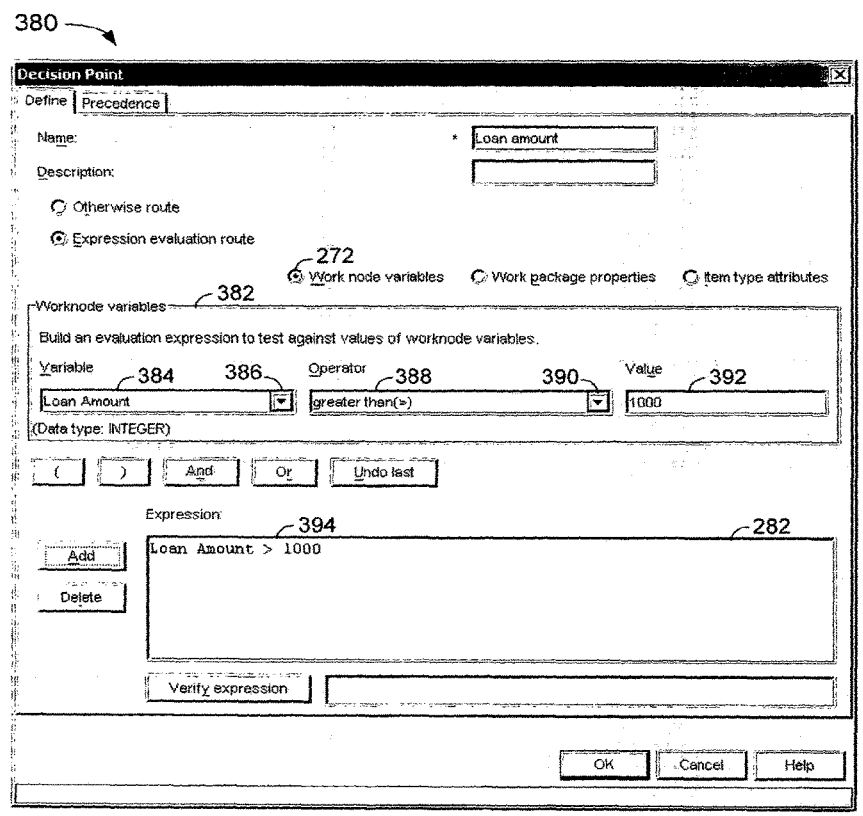
FIG. 17 depicts an embodiment of a decision point window provided by the workflow builder of FIG. 3 which has a dialog for a work node variable.

FIG. 17 depicts an embodiment of a decision point window 380, provided by the workflow builder 100 of FIG. 3, which has a work node variables dialog 382 for a work node variable. The work node variables dialog 382 is displayed in response to activating the work-node-variables radio button 272. The work node variables dialog 382 comprises a work node variable name text area 384 associated with a work node variable name down arrow 386, an operator text area 388 associated with an operator down arrow 390, and a value text area 392. A user may enter a value into the value text area 392. The operator text area 388 is similar to the operator text area 286 of FIG. 14 and will not be further described. When the work node variable down arrow 386 is clicked on, a list of names of work node variables is displayed. The work node variables are retrieved from the work node variables table 120 of FIG. 3. In response to the add button being activated, the constructed decision point expression 394 using the work node variable is displayed in the expression area 282.

Figure 18:
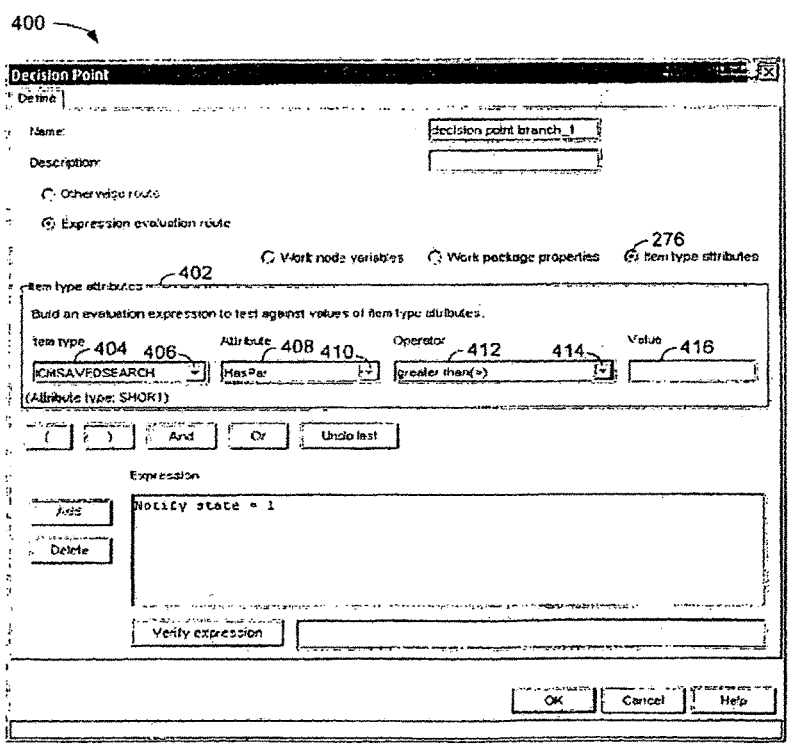
FIG. 18 depicts an embodiment of the decision point window provided by the workflow builder of FIG. 3 which has an item type attributes dialog.

FIG. 18 depicts an embodiment of a decision point window 400, provided by the workflow builder 100 of FIG. 3, which has an item type attributes dialog 402. The item type attributes dialog 402 is displayed in response to activating the item type attributes radio button 276. In the item type attributes dialog 402, an item type text area 404 displays the name of the selected item type. In response to activating the item type down arrow 406, a list of item type names is displayed. The item type names are retrieved from an item type attributes table 122 (FIG. 3) using a predefined application programming interface (API), for example, in some embodiments, the DB2 Content Manager connector (ICM connector) APIs. An attribute text area 408 displays the name of the selected attribute. In response to activating an attribute down arrow 410, a list of attribute names is displayed for the selected item type name. The attributes names are retrieved from an item type attributes table 122 (FIG. 3) using the predefined application programming interface. An operator text area 412 displays the name of the selected operator. In response to activating an operator down arrow 414, a list of operator names is displayed. A value text area 416 allows a user to enter a value.

Figure 19:
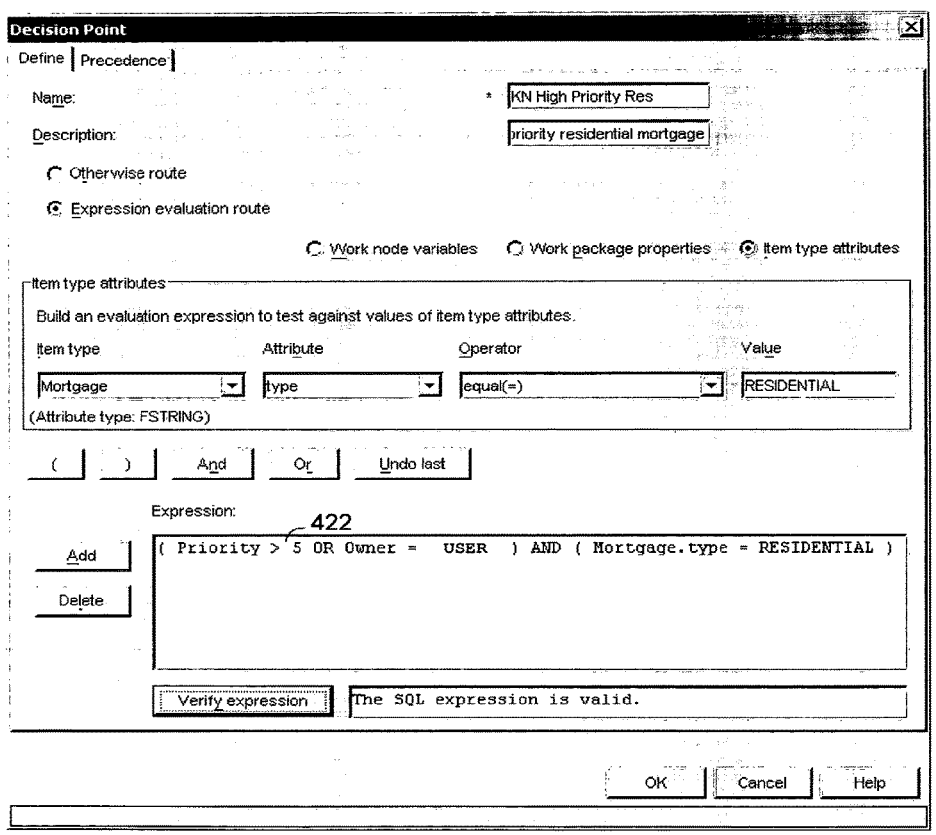
FIG. 19 depicts an embodiment of a decision point window provided by the workflow builder of FIG. 3 in which a portion of a decision point expression is constructed based on work package properties and another portion of the decision point expression is constructed based on the item type attributes.

FIG. 19 depicts an embodiment of a decision point window 420 provided by the workflow builder of FIG. 3 in which a portion of an exemplary decision point expression 422 is constructed based on the work package properties and another portion of the expression is constructed based on the item type attributes. The exemplary SQL expression that is generated based on the decision point expression 422 is:
SELECT 1 FROM ICMUT002041 WP, ICMUT0100001 UT1 WHERE ((WP.PRIORITY>5) OR (WP.ASSIGNEDUSERID='USER') AND (UT1.ATTR0001='Residential' AND WP.RTARGETITEMID=UT1.ITEMID AND WP.RTARGETVERSIONID=UT1.VERSIONID)) AND (WP.COMPONENTID=?")

Figure 20:
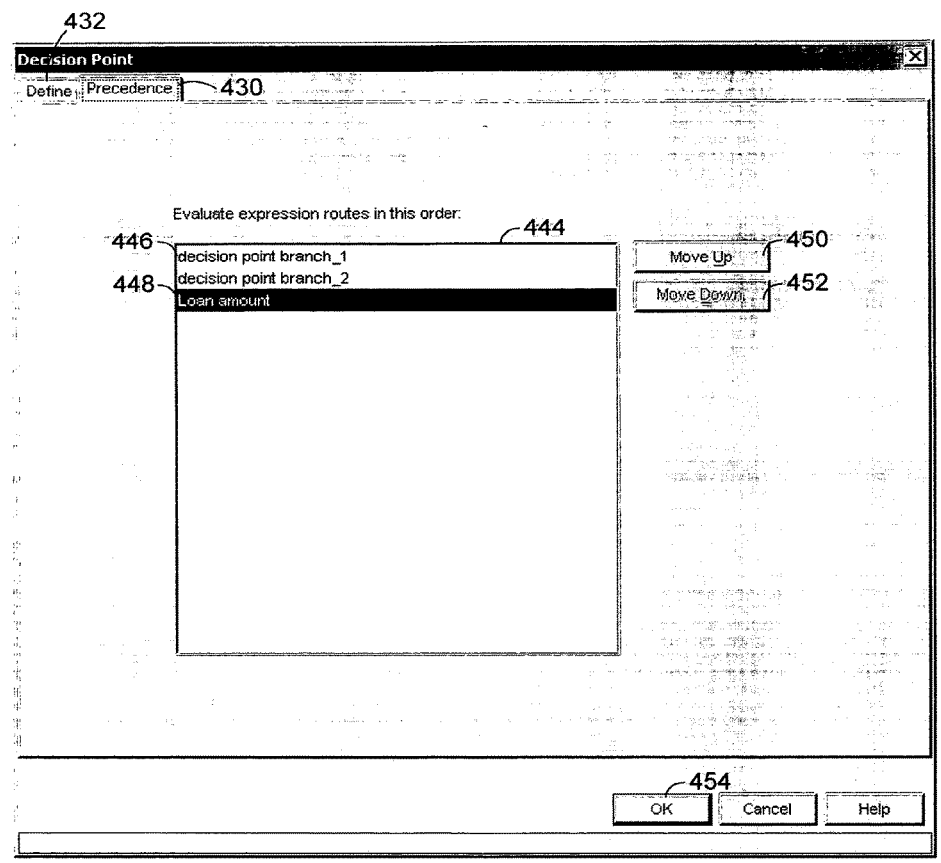
FIG. 20 depicts a diagram of an embodiment of a precedence tab provided by the workflow builder of FIG. 3 to define the precedence of the SQL expressions associated with the decision point work node.

FIG. 20 depicts a diagram of an embodiment of a precedence tab 430 provided by the workflow builder of FIG. 3 to define the precedence of the SQL expressions associated with the decision point work node. In various embodiments the workflow builder 100 (FIG. 3) displays the precedence tab for a branch of a decision point work node when that decision point work node has at least two branches which are expression evaluation routes. The name of the decision point is displayed in the associated define tab 432. The precedence tab has a list area 444 which displays all of the route or branch names of the decision point for which SQL expressions have been generated. The branch names are listed in accordance with their precedence. The top branch, decision point branch_1, will be evaluated first. The bottom branch, Loan amount, will be evaluated last. Move up and move down buttons, 450 and 452, respectively, allow a user to change the precedence of a selected branch.

In response to activating the okay button 454, the update precedence module 108 (FIG. 3) is invoked. The update precedence module 108 (FIG. 3) updates the precedence 212 (FIG. 10) in the route list table 123 (FIG. 10) for the branch names of the decision point work node which are expression evaluation routes in accordance with the precedence specified in the list area 444. In this example, the topmost branch, decision point branch_1, has a precedence of one, the next branch, decision point branch_2, has a precedence of two and the last branch, "Loan amount" has a precedence of three.

Figure 21:
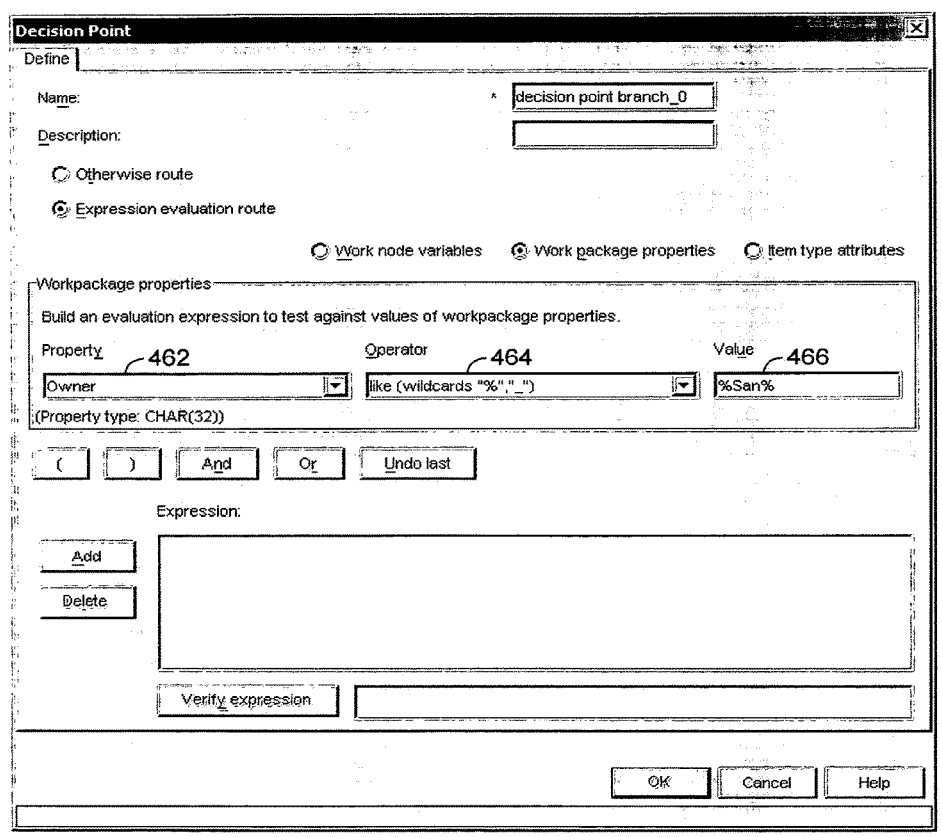
FIG. 21 depicts an embodiment of a decision point window provided by the workflow builder of FIG. 3 which provides wildcard characters.

FIG. 21 depicts an embodiment of a decision point window 460 provided by the workflow builder of FIG. 3 which provides wildcard characters. In FIG. 21, the "Notify state" work package property has two possible values—one and zero. As shown in FIG. 21, in response to a user selecting the "Owner" work package property 462 and a wildcard operator 464, the user enters a value 466, in this example, % San %.

Figure 22:
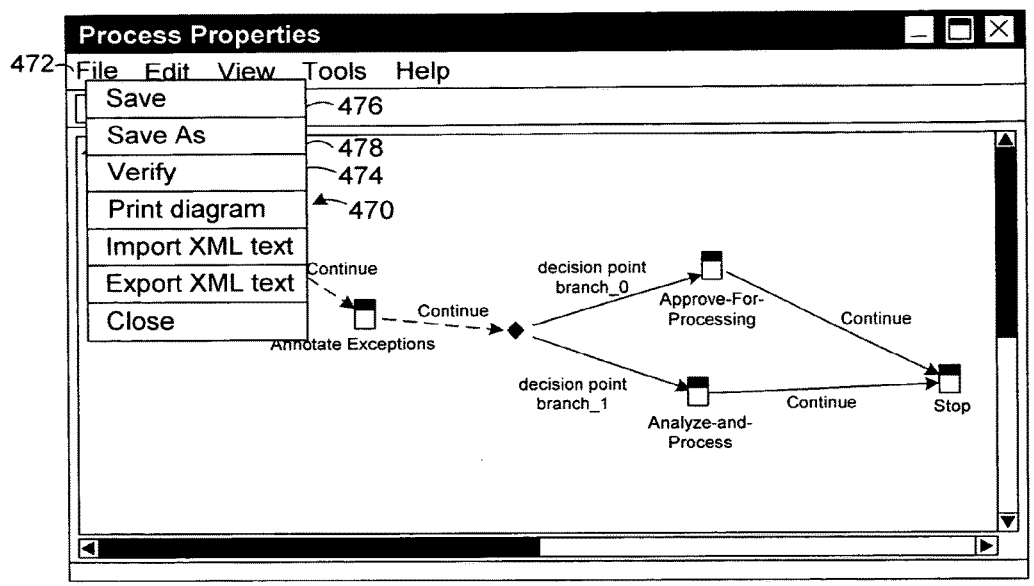
FIG. 22 depicts the exemplary workflow process properties window of FIG. 5 in which a menu, associated with the "File" button, is displayed, the menu having a "Verify" menu item to verify the displayed workflow process, and "Save" and "Save As" menu items to save the displayed workflow process.

FIG. 22 depicts the exemplary workflow process properties window of FIG. 5 in which a menu 470, associated with the "File" button 472, is displayed. The menu has a "Verify" menu item 474 to verify the workflow process, and "Save" and "Save As" menu items, 476 and 478, respectively, to save the workflow process.

In response to activating the "Verify" menu item 474, the verify workflow process module 112 (FIG. 3) is invoked. The verify workflow process module 112 (FIG. 3) verifies the workflow process and saves the information in the dialog save area 116 (FIG. 3) in the route list table 123 (FIG. 10). In various embodiments, for a decision point work node, for each destination work node, the branch name, decision point work node name, destination work node name, SQL expression and precedence are stored in the branch name 202 (FIG. 10), from-node name 204 (FIG. 10), to-node name 206 (FIG. 10), SQL expression 210 (FIG. 10) and precedence 212 (FIG. 10), respectively, of the route list table 123 (FIG. 10). In various embodiments, the SQL expression stored in the route list table is a runtime SQL expression and may not be the same as the SQL verification expression. For an otherwise branch, no SQL expression is stored, and the precedence is set equal to zero. In addition, information to render the workflow diagram, including any decision point expressions, is stored in the diagram object 125 (FIG. 3).

In response to activating the "Save" menu item 476 or the "Save As" menu item 478 to save the workflow process, the save workflow process module 114 (FIG. 3) and the save as workflow process module 115 (FIG. 3), respectively, is invoked. The save workflow process module 114 (FIG. 3) and the save as workflow process module 115 (FIG. 3) save the SQL expression and the associated precedence in the SQL expression column 210 (FIG. 10) and precedence column 212 (FIG. 10) of the route list table 123 (FIG. 10) for the associated branch, in addition to saving the workflow diagram with the decision point expression in the diagram object 125 (FIG. 3) as a binary large object. The diagram object 125 (FIG. 3) is used to render the diagram when the user re-opens the workflow process.

Figure 23:
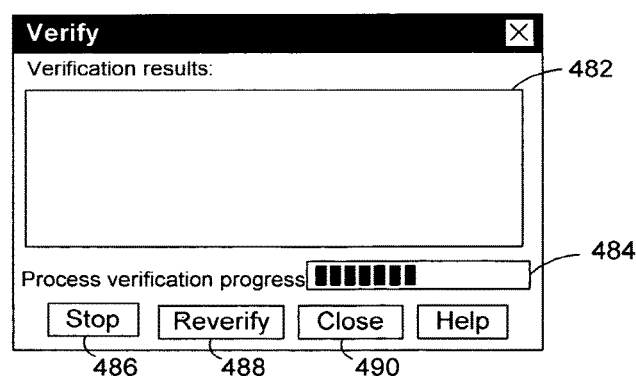
FIG. 23 depicts an exemplary verify workflow process window which is displayed in response to activating the "Verify" menu item of FIG. 22.

FIG. 23 depicts an exemplary verify workflow process window 480 which is displayed by the verify workflow process module 112 (FIG. 3) in response to the activation of the "Verify" menu item 474 of FIG. 22. A verification text area 482 displays the results of verifying the workflow process. A verification progress bar 484 displays a series of vertical bars which show the progress of the workflow verification. In response to activating a "Stop" button 486, a stop module stops the verification of the workflow process. In response to activating a "Reverify" button 488, a verify workflow module, which in some embodiments, is part of the verify workflow process module, is invoked to verify the workflow process. In response to activating a "Close" button 490, a close module is invoked which closes the verify workflow process window 480.

FIG. 24 depicts an exemplary work basket properties window 500 in which a work node variable of the type integer is defined. In various embodiments, referring also to the administration window 128 of FIG. 4, the work basket properties window 500 is provided by the work basket properties module 118 (FIG. 3) which is invoked in response to clicking on the "Work Baskets" item 492 (FIG. 4).

In various embodiments, using the work basket properties window, a user can define a work node variable. The work node variable type is selected and displayed in a variable type text box 502. In response to a work-node-variable down arrow 504 being activated, a list of work node variable types is displayed. The work node variable name is entered in the work node variable name text area 506. In response to the activation of the "Add" button 508, the work node variable name and type are stored in the work node variables table 120 (FIG. 3).

FIG. 25 depicts an exemplary list of work node variable types 510. The list of work node variable types 510 comprises an integer type, a timestamp type and a character type.

FIG. 26 depicts the exemplary work basket properties window 500 of FIG. 24 in which a work node variable of the type timestamp is defined. The work node variable type is selected and displayed in the variable type text box 502. The work node variable name is entered in the work node variable name text area 506.

Figure 27:
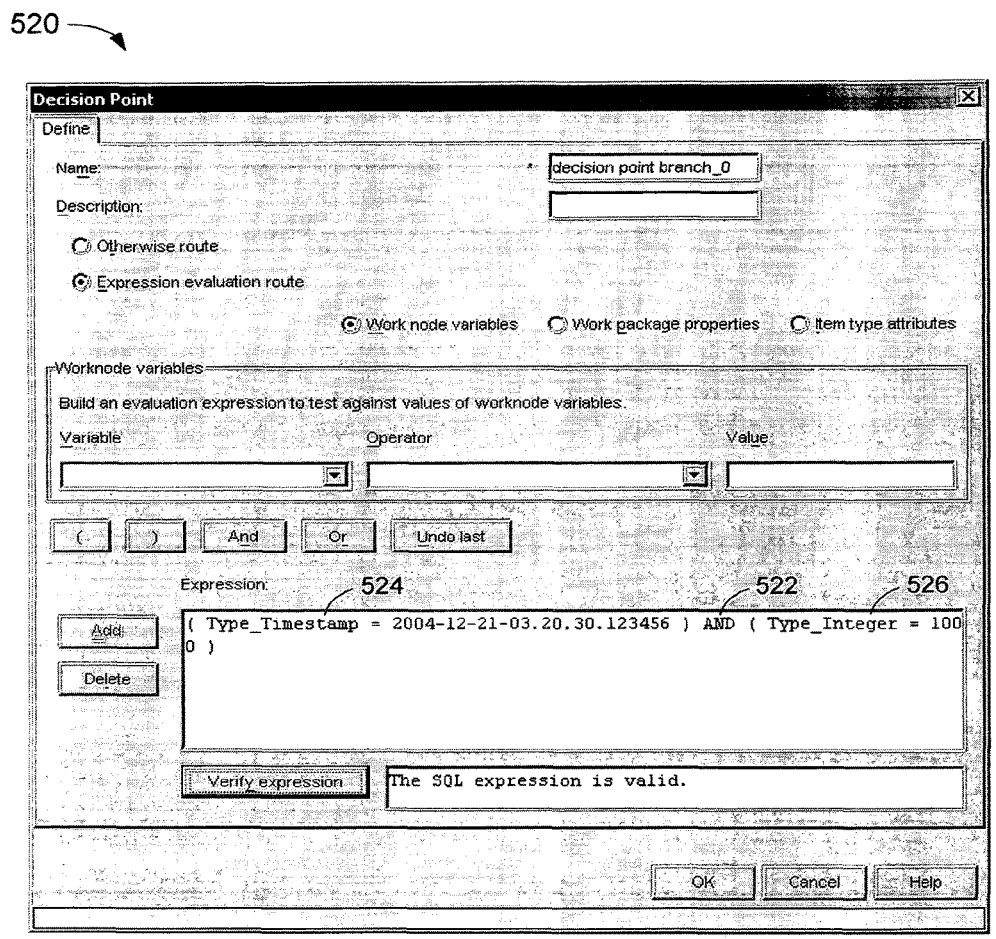
FIG. 27 depicts an embodiment of a decision point window provided by the workflow builder of FIG. 3 in which a decision point expression with having point variables with a type of timestamp and integer is displayed.

FIG. 27 depicts an embodiment of a decision point window 520 provided by the workflow builder of FIG. 3 in which a decision point expression 522 with decision point variables having a type of timestamp and integer, 524 and 526, respectively, is displayed.

In various embodiments, a work node variable can have a type of integer, timestamp or character. In some embodiments, in the work node variables table 120 (FIG. 3), the data is stored as character. When the verify expression module 102 (FIG. 3) generates the SQL expression for a decision point expression which has a work node variable, the verify expression module 102 (FIG. 3) retrieves the type for the work node variable from the work node variables table 120 (FIG. 3). If the work node variable was defined with a type of timestamp or integer, the SQL expression is generated with the scalar functions so that the database management system will process the query correctly, for example, LoanAmount>1000. The scalar functions may be different for different database management systems, therefore when the SQL expression is generated token values are placed in the SQL string. For example, various embodiments of the present invention may work with the Oracle® database management system. The token value is @TO_TIMESTAMP for timestamps. The token value is @TO_INTEGER for integers. When the SQL expression is executed, the workflow process execution module 94 (FIG. 3) identifies the database management system and replaces the token value with the correct scalar function. For example, when the IBM DB2 database management system is used, the scalar function for timestamp is TIMESTAMP(worknodeVariable) and the scalar function for integer is INTEGER( ).

When the Oracle database management system is used, the scalar function for timestamp is TO_TIMESTAMP(worknodeVariable) and the scalar function for integer is TO_NUMBER( ).

An exemplary SQL expression is generated for the decision point expression 522 of FIG. 27. The decision point expression has two work node variables. One work node variable contains integer data and the other work node variable contains timestamp data. The verify expression module identifies the database management system and produces a SQL expression with the token values referred to as a runtime SQL expression. The verify expression module converts the token values to the appropriate timestamp and integer scalar functions in accordance with the database management system so that the SQL prepare statement may be executed for the SQL expression. The following is the exemplary SQL verification expression which is generated:

```
SELECT 1 FROM ICMUT00204001 WP WHERE ( EXISTS (SELECT 1 FROM
ICMUT00208001 CD WHERE ((WP.ICMORIGCOMPID = CD.PARENTCOMPID OR
CD.PARENTCOMPID=WP.COMPONENTID) AND (
CD.CONTAINERDATANAME= 'Type_Timestamp' AND
TIMESTAMP(CD.CONTAINERDATAVAL) = TIMESTAMP('2004-12-21-
03.20.30.123456' )) )) ) AND ( EXISTS (SELECT 1 FROM
ICMUT00208001 CD WHERE ((WP.ICMORIGCOMPID=CD.PARENTCOMPID OR
CD.PARENTCOMPID=WP.COMPONENTID) AND (
CD.CONTAINERDATANAME= 'Type_Integer' AND
INTEGER(CD.CONTAINERDATAVAL) =1000 )))) AND (WP.COMPONENTID=?)
```

The following is the runtime SQL expression which the verify expression module generates and which is stored in the route list table 123 (FIG. 10):

```
SELECT 1 FROM ICMUT00204001 WP WHERE ( EXISTS (SELECT 1 FROM
ICMUT00208001 CD WHERE ((WP.ICMORIGCOMPID=CD.PARENTCOMPID OR
CD.PARENTCOMPID=WP.COMPONENTID) AND (
CD.CONTAINERDATANAME='Type_Timestamp' AND
@TO_TIMESTAMP(CD.CONTAINERDATAVAL) = @TO_TIMESTAMP('2004-12-21-
03.20.30.123456' )) )) ) AND ( EXISTS (SELECT 1 FROM
ICMUT00208001 CD WHERE ((WP.ICMORIGCOMPID=CD.PARENTCOMPID OR
CD.PARENTCOMPID=WP.COMPONENTID) AND (
CD.CONTAINERDATANAME='Type_Integer' AND
@TO_NUMBER(CD.CONTAINERDATAVAL) =1000 )))) AND (WP.COMPONENTID=?)
```

In the runtime SQL expression above, the token values are @TO_TIMESTAMP and @TO_NUMBER.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:
1. A computer-implemented method comprising:
providing a decision point work node at a server, the server in network communication with multiple different client work nodes across a network in a workflow system, the decision point work node being associated with a plurality of different client work nodes of the multiple different client work nodes, wherein rules for the decision point work node are defined by at least one SQL expression, the evaluation of which dictates to which client work node of the plurality of different client work nodes a work package is to be routed, wherein the at least one SQL expression is generated based on at least one decision point expression, wherein a decision point expression of the at least one decision point expression is validated by determining whether the decision point expression is constructed using tables, variables, and values, and wherein the decision point expression is constructed based on a user selecting at least one from the group consisting of a work node variable, a work package property, and an item type attribute;
evaluating the at least one SQL expression, the evaluating deciding to which client work node, of the plurality of different client work nodes, the work package is to be routed, and the evaluating selecting from the plurality of different client work nodes to select a client work node, of the plurality of different client work nodes, to be the client work node, of the plurality of different client work nodes, to which the work package is to be routed; and
based on the evaluating deciding to route the work package to the selected client work node, routing the work package from the decision point work node to that selected client work node.

2. The method of claim 1, further comprising designating a client work node of the plurality of different client work nodes associated with the decision point work node as an otherwise work node, wherein each SQL expression of the at least one SQL expression corresponds to a respective other client work node of the plurality of different client work nodes associated with the decision point work node, and wherein the routing comprises routing the work package to the otherwise work node based on each SQL expression of the at least one SQL expression evaluating to false.

3. The method of claim 1, further comprising:
verifying the at least one SQL expression.

4. The method of claim 3, further comprising: providing an indication of a result of the verifying.

5. The method of claim 3, wherein the verifying performs a SQL prepare for the at least one SQL expression.

6. The method of claim 2, further comprising associating each SQL expression of the at least one SQL expression with a respective precedence value, wherein the evaluating the at least one SQL expression is performed in accordance with the precedence value of each SQL expression of the at least one SQL expression.

7. The method of claim 1, wherein the decision point expression is constructed based on selecting a respective value of at least one of a work node variable, a work package property, and an item type attribute.

8. The method of claim 1, further comprising:
identifying a database management system associated with the work package; and
adjusting the at least one SQL expression in accordance with the database management system.

9. A system, the system comprising a processor, and a memory device coupled to the processor, wherein the memory device stores an application which, when executed by the processor, causes the processor to perform a method comprising:
providing a decision point work node at a server, the server in network communication with multiple different client work nodes across a network in a workflow system, the decision point work node being associated with a plurality of different client work nodes of the multiple different client work nodes, wherein rules for the decision point work node are defined by at least one SQL expression, the evaluation of which dictates to which client work node of the plurality of client work nodes a work package is to be routed, wherein the at least one SQL expression is generated based on at least one decision point expression, wherein a decision point expression of the at least one decision point expression is validated by determining whether the decision point expression is constructed using tables, variables, and values, and wherein the decision point expression is constructed based on a user selecting at least one from the group consisting of a work node variable, a work package property, and an item type attribute;
evaluating the at least one SQL expression, the evaluating deciding to which client work node, of the plurality of different client work nodes, the work package is to be routed, and the evaluating selecting from the plurality of different client work nodes to select a client work node, of the plurality of different client work nodes, to be the client work node, of the plurality of different client work nodes, to which the work package is to be routed; and
based on the evaluating deciding to route the work package to the selected client work node, routing the work package from the decision point work node to the selected client work node.

10. The system of claim 9, wherein the method further comprises designating a client work node of the plurality of different client work nodes associated with the decision point work node as an otherwise work node wherein each SQL expression of the at least one SQL expression corresponds to a respective other client work node of the plurality of different client work nodes associated with the decision point work node and wherein the routing comprises routing the work package to the otherwise work node based on each SQL expression of the at least one SQL expression evaluating to false.

11. The system of claim 9, wherein the method further comprises verifying the at least one SQL expression.

12. The system of claim 11, wherein the method further comprises providing an indication of a result of the verifying.

13. The system of claim 11, wherein the verifying performs a SQL prepare for the at least one SQL expression.

14. The system of claim 10,
wherein the method further comprises associating each SQL expression of the at least one SQL expression with a respective precedence value, wherein the evaluating the at least one SQL expression is performed in accordance with the precedence value of each SQL expression for the at least one SQL expression.

15. The system of claim 14, wherein the decision point expression is constructed based on selecting a respective value of at least one of a work node variable, a work package property, and an item type attribute.

16. The system of claim 9, wherein the method further comprises:
   identifying a database management system associated with the work package; and
   adjusting the at least one SQL expression in accordance with the database management system.

17. The method of claim 1, wherein the at least one SQL expression comprises a plurality of SQL expressions, each SQL expression of the plurality of SQL expressions being associated with a respective client work node of the plurality of different work nodes, and wherein, for each SQL expression of the plurality of SQL expressions, the server is configured to route the work package to the respective client work node with which the SQL expression is associated based on the SQL expression evaluating to true.

18. The system of claim 9, wherein the at least one SQL expression comprises a plurality of SQL expressions, each SQL expression of the plurality of SQL expressions being associated with a respective client work node of the plurality of different work nodes, and wherein, for each SQL expression of the plurality of SQL expressions, the server is configured to route the work package to the respective client work node with which the SQL expression is associated based on the SQL expression evaluating to true.

* * * * *